US006789330B2

(12) United States Patent
Ally et al.

(10) Patent No.: US 6,789,330 B2
(45) Date of Patent: Sep. 14, 2004

(54) APPARATUS AND METHOD FOR DRYING SOLUTIONS CONTAINING MACROMOLECULES

(75) Inventors: Abdul H. Ally, Gaithersburg, MD (US); Brent W. Henry, Gaithersburg, MD (US); Michael W. Schuette, Vienna, VA (US)

(73) Assignee: Invitrogen Corporation, Carlsbad, CA (US)

( * ) Notice: Subject to any disclaimer, the term of this patent is extended or adjusted under 35 U.S.C. 154(b) by 64 days.

(21) Appl. No.: 09/741,735

(22) Filed: Dec. 21, 2000

(65) Prior Publication Data

US 2001/0020611 A1 Sep. 13, 2001

Related U.S. Application Data

(62) Division of application No. 09/489,679, filed on Jan. 24, 2000, now abandoned, which is a division of application No. 09/005,477, filed on Jan. 12, 1998, now Pat. No. 6,041,515.

(51) Int. Cl.[7] .................................................. B01D 1/14

(52) U.S. Cl. ............................ 34/380; 34/364; 34/413; 34/487; 34/493; 422/108; 422/109

(58) Field of Search .......................... 34/343, 362, 363, 34/364, 380, 413, 443, 470, 477, 487, 493; 422/108, 171, 190, 109

(56) References Cited

U.S. PATENT DOCUMENTS

| | | | |
|---|---|---|---|
| 3,991,482 | A | 11/1976 | Brock et al. |
| 4,003,713 | A | 1/1977 | Bowser |
| 4,597,192 | A | 7/1986 | Sfondrini et al. |
| 4,707,452 | A | 11/1987 | Friswell |
| 4,967,486 | A | 11/1990 | Doelling |
| 5,079,855 | A | 1/1992 | Carrier |
| 5,100,623 | A | 3/1992 | Friswell |
| 5,119,571 | A | 6/1992 | Beasley |
| 5,154,010 | A | 10/1992 | Klemm |
| 5,210,959 | A | 5/1993 | Brestovansky et al. |
| 5,271,161 | A | 12/1993 | Brinck, II |
| 5,271,164 | A | 12/1993 | Yoshimura et al. |
| 5,289,642 | A | 3/1994 | Sloan |
| 5,371,950 | A | 12/1994 | Schumacher |
| 5,488,925 | A | 2/1996 | Kumada |

(List continued on next page.)

FOREIGN PATENT DOCUMENTS

| | | | | |
|---|---|---|---|---|
| DE | 4316163 | A | * | 5/1993 |
| GB | 202082 | A | * | 2/1923 |

*Primary Examiner*—Jiping Lu
(74) *Attorney, Agent, or Firm*—Sterne, Kessler, Goldstein & Fox PLLC

(57) ABSTRACT

An apparatus and method for quickly drying solutions in one or more arrays of vessels includes a manifold that receives gas and a base plate that receives the one or more arrays of vessels. The manifold includes one or more hollow tubes that direct the gas into the vessels, where the gas evaporates the solutions. A variety of types of hollow tubes are disclosed. In an exemplary embodiment, the gas is filtered, pressurized and/or heated. In an exemplary embodiment, the solutions are heated. The base plate is hingeably coupled to the manifold so that the base plate has an open position and a closed position. The open position permits users to place and remove the vessels that contain solutions to be dried. In the closed position, the base plate and the manifold are in sealing engagement with one another, wherein the one or more of the hollow tubes extend into the vessels. A unique hinging system is disclosed that couples one or more base plates to a base so that, when the base plate is in the open position, the base plate is substantially horizontal. When the base plate is in the closed position, it is tilted at an angle so that the vessels are tilted at the angle, providing the solutions to be dried with a greater surface area. A variety of optional vapor recovery systems are disclosed. A variety of open loop and closed loop electrical control systems are disclosed.

37 Claims, 27 Drawing Sheets

U.S. PATENT DOCUMENTS 5,513,445 A * 5/1996 Farrag .......................... 34/362
5,514,336 A 5/1996 Fox
5,553,395 A * 9/1996 Wen et al. ..................... 34/359
5,558,842 A * 9/1996 Vassiliou et al. ........... 422/108
5,749,156 A 5/1998 Mokler
6,002,019 A 12/1999 Tamhankar et al.
6,122,837 A * 9/2000 Olesen et al. ................. 34/315

* cited by examiner

APPARATUS AND METHOD FOR DRYING SOLUTIONS CONTAINING MACROMOLECULES

BACKGROUND OF THE INVENTION

1. Field of the Invention

The present invention relates to an apparatus and method for drying solutions containing macromolecules.

2. Background Art

Solutions, such as those used for deoxyribonucleic acid (DNA) synthesis, are often dried for long-term storage. These dried solutions can be reconstituted for use when needed. This technique is particularly useful in areas in which refrigerated storage is prohibitively expensive or unavailable. In these areas, room temperature storage of dried solutions is the only means available to store and use the necessary solutions.

Conventional devices for drying solutions include vacuum and centrifugal force systems, such as those available from Savant Instruments, Inc., of Holbrook, N.Y. These devices use a vacuum to increase the rate of evaporation. A vacuum, however, can cause foaming and bumping, resulting in sample loss and contamination of other samples. Moreover, vacuum pumps can be damaged by the solutions being dried and thus require vapor traps. Centrifugal force, generated by spinning the samples, may reduce foaming and bumping. However, mechanisms for spinning the samples include rotors and motors that have to be carefully balanced. Balancing includes loading samples to be dried in prescribed manners. Failure to maintain proper balance can lead to oscillating vibrations that can cause catastrophic failure of rotors and motors. Conventional drying systems can take several hours to dry a set of solutions.

What is needed is a reliable, low maintenance, apparatus and method for quickly drying solutions in large arrays of vessels.

BRIEF SUMMARY OF THE INVENTION

The present invention is an apparatus and method for quickly drying solutions in large arrays of vessels. The apparatus includes a dryer manifold that holds large arrays of vessels which contain solutions to be dried. The solutions to be dried can include macro-molecules such as ribonucleic acid (RNA), DNA, oligonucleotides, proteins, lipids, carbohydrates, polypeptides, cells, chemical compounds and combinations thereof. Gas, which can be inert gas, air, oxygen, nitrogen, or any other gas or mixture of gasses that are suitable for drying solutions, is provided to the dryer manifold, which directs the gas into the arrays of vessels. Preferably, the gas is pressurized. More preferably, the gas is pressurized and heated. More preferably still, the gas is pressurized, heated and filtered. Preferably, the solutions to be dried are heated. The combination of heating the solutions and directing heated gas over the solutions, quickly evaporates the solutions to be dried. Exhaust vapors are removed from the vessels and is optionally captured by a vapor recovery system.

In an exemplary embodiment, the dryer manifold includes a manifold that receives gas and a base plate that receives the array of vessels that contain solutions to be dried. In an exemplary embodiment, the manifold includes a nozzle plate which has an array of passages therethrough. A hollow tube extends downwardly from each of the passages and towards the base plate. A baffle within the manifold guides the gas through the nozzle plate passages and through the hollow tubes. The hollow tubes direct the gas into the vessels, where the gas evaporates the solutions. Preferably, the hollow tubes extend into the vessels.

Preferably the dryer manifold heats the solutions to be dried. For example, the base plate can be heated. In an exemplary embodiment, the base plate receives one or more removable vessel tray that hold a plurality of vessels. The heated base plate heats the solutions in the vessel trays.

The present invention can employ a variety of types of downwardly extending hollow tubes to provide the gas into the vessels. In an exemplary embodiment, one or more of the downwardly extending hollow tubes include a substantially downwardly-facing opening that directs the gas substantially directly at a surface of a solution in a vessel. In another exemplary embodiment, one or more of the downwardly extending hollow tubes include one or more substantially horizontally-facing openings that direct the gas substantially horizontal to a surface of a solution in a vessel. In another exemplary embodiment, the present invention employs a combination of substantially downwardly-facing openings and substantially horizontally-facing openings.

The present invention can utilize an inlet filter, such as a high extraction particulate air (HEPA) filter, to filter the gas that is provided to the dryer manifold. An inlet fan can be utilized to pressurize the gas and an inlet heater can be utilized to heat the gas. An exhaust fan can be utilized to draw exhaust vapors from the dryer manifold.

In an exemplary embodiment, the base plate is hingedly coupled to the manifold so that the base plate has an open position and a closed position. The open position permits users to place and remove vessels in the dryer manifold. In the closed position, the base plate and the manifold are in sealing engagement with one another. Preferably, when in the closed position, the downwardly extending tubes extend into the vessels without contacting the vessels and contacting the solutions in the vessels.

In an exemplary embodiment, when the base plate is in the closed position, the vessels are tilted at an angle. By tilting the vessels at the angle, the solutions are provided with a greater surface area, which increases the rate of drying.

A unique hinging system is disclosed which hinges each base plate so that is rotates about a pivoting point that is relatively distant from the corresponding manifold. This ensures that the downwardly extending tubes can extend into the vessels when the base plate is moved into the closed position, without the downwardly extending tubes contacting the vessels.

A base can be employed which permits multiple manifold and base plate assemblies to extend therefrom. The base permits the entire dryer manifold to be supported by a small surface area. The present invention is thus highly scalable in that the dryer manifold can include a plurality of manifolds and base plate assemblies. In an exemplary embodiment, the dryer manifold includes two, substantially mirror image, manifold and base plate assemblies, wherein each base plate can hold an array of vessels.

Where multiple manifold and base plate assemblies are employed, a duct system can be utilized to provide gas to the assemblies. One or more inlet heaters can be disposed within the duct system to heat the gas.

The present invention can employ an optional vapor recovery system which recovers exhaust vapors from the one or more vessels that contain solutions to be dried. The optional vapor recovery system can, for example, include a conventional vapor recovery system disposed downstream of the dryer manifold. In addition, or alternatively, the optional vapor recovery system can include a coaxial tube system that prevents exhaust vapors from a vessel from contaminating a solution in another vessel.

In order to control the drying of solutions in vessels, the present invention includes an electrical control system that can adjust the pressure and temperature of the gas and/or the temperature of the solutions to be dried. In an exemplary embodiment, the electrical control system includes one or more open-loop systems, such as manual adjustments, which control the pressure and temperature of the gas and/or the temperature of the solutions to be dried. In another exemplary embodiment, the electrical control system includes one or more closed-loop systems that control temperatures and pressures, based on comparisons of measured values and predetermined values. In another exemplary embodiment, the electrical control system is a combination of open-loop and closed-loop systems.

The present invention can substantially prevent bumping and boiling of the solution in the vessel by controlling the pressure and temperature of the gas and/or the temperature of the solutions, based on the level of solution in a vessel. For example, when a solution level is high, one or more of the pressure and temperatures can be set to low settings. When a sufficient amount of the solution dries, the pressure and temperatures can be set to a higher setting. With an open loop electrical control system, a user can manually adjust one or more controls based upon the level of solution in a vessel. In a closed loop electrical control system, the level of solution can be monitored with one or more level detectors and the electrical control system can control the pressure and temperature of the gas and/or the solution temperature, accordingly.

The drying can be terminated by a timer or by a manual control. Alternatively, the present invention can include one or more moisture sensors that sense the moisture content in the vessels and/or in the exhaust vapor. The electrical control system can terminate the process when the moisture content reaches a predetermined level.

Further features and advantages of the present invention, as well as the structure and operation of various embodiments of the present invention, are described in detail below with reference to the accompanying drawings.

BRIEF DESCRIPTION OF THE DRAWINGS/FIGURES

The foregoing and other features and advantages of the invention will be apparent from the following, more particular description of an embodiment of the invention, as illustrated in the accompanying drawings.

DETAILED DESCRIPTION OF THE INVENTION

I. General Overview

The present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention.

In the figures, like reference numbers generally indicate identical, functionally similar, and/or structurally similar elements. The figure in which an element first appears is indicated by the leftmost digit(s) in the reference number.

Figure 1:
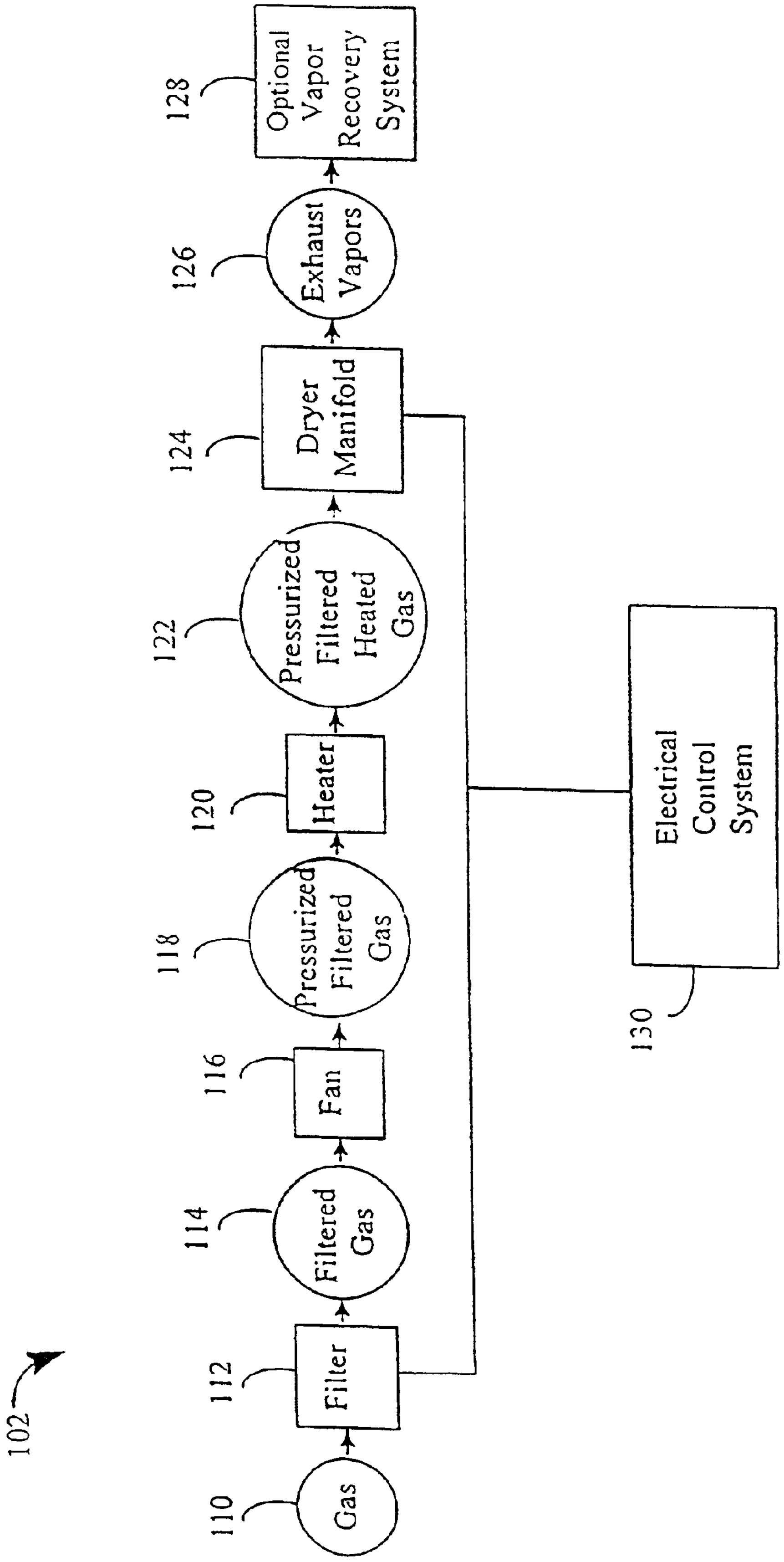
FIG. 1 illustrates a high-level block diagram of a drying system, in accordance with the present invention.

Referring to FIG. 1, a drying system 102 includes a dryer manifold 124 that dries solutions contained in one or more arrays of vessels by directing gas 110, which can be inert gas, air, oxygen, nitrogen, or any other gas or mixture of gasses that are suitable for drying, into the vessels. The solutions can be, for example, solutions that contain macromolecules including, but not limited to, DNA, proteins, lipids, carbohydrates, RNA, oligonucleotides, polypeptides, cells, antibiotics, chemical compounds, enzymes (DNA or RNA polymerases such as thermostable DNA polymerases including Taq, Tma, or Tne DNA polymerases, restriction endonucleases, ligases, reverse transcriptases, etc.), antibodies or combinations thereof. The solutions can also be, for example, liquid reagents used in diagnostic applications, assays used in clinical environments or assays used in research applications.

In an exemplary embodiment, system 102 includes a filter 112, that receives and filters gas 110 to generate filtered gas 114. A fan 116 pressurizes gas 140 to generate filtered, pressurized gas 118. A heater 120 heats filtered, pressurized gas 118 to generate filtered, pressurized, heated gas 122. In this embodiment, gas 110 is provided to dryer manifold 124 as filtered, pressurized, heated gas 122.

One skilled in the relevant art will recognize that one or more of filter 112, fan 116 and heater 120 can be arranged in a variety of manners. Moreover, one or more of filter 112, fan 116 and heater 120 can be omitted. Thus, throughout the remainder of this disclosure, it is to be understood that the phrases gas 110, gas 114, gas 118, gas 122 and inlet gas are generally used interchangeably. Unless otherwise noted, each of these terms are used broadly to refer to any type of gas, including, but not limited to, filtered gas, pressurized gas, heated gas, etc., or any combination thereof.

Dryer manifold 124 holds a plurality of vessels (not shown in FIG. 1) which contain solutions to be dried and directs gas 110 into the vessels. In an exemplary embodiment, dryer manifold 124 directs gas 110 substantially toward the surface of the solutions to be dried. In an alternative embodiment, dryer manifold 124 directs gas 110 substantially horizontal to the surface of the solutions to be dried. Gas 110 induces evaporation of the solutions, which generates exhaust vapors 126. The process leaves substantially dry macromolecule substances in the vessels.

Exhaust vapors 126 can be vented into the atmosphere. Alternatively, exhaust vapors 126 can be recovered by an optional vapor recovery system. The optional vapor recovery system can include, for example, a conventional vapor recovery system 128, downstream of dryer manifold 124. Additionally, or alternatively, the optional vapor recovery system can include elements within dryer manifold 124, such as elements that prevent exhaust vapors 126 that exit one vessel from contaminating solutions in other vessels.

In an exemplary embodiment, dryer manifold 124 heats the solutions to be dried in order to further speed the drying process. In an exemplary embodiment, the vessels containing solutions to be dried are tilted on an angle to increase an exposed surface area of the solutions, thereby increasing evaporation rates of the solutions.

An optional electrical control system 130 provides power and control signals to one or more of fan 116, heater 120, dryer manifold 124 and vapor recovery system 128. In an exemplary embodiment, electrical control system 130 is an open-loop system that includes manually operated controls to control, for example, a speed of fan 116, a temperature of heater 120 and/or a temperature of dryer manifold 124.

In an alternative exemplary embodiment, electrical control system 130 is a closed-loop system that receives electrical signals representative of, for example, a pressure of gas 122, a temperature of gas 122 and/or a temperature of dryer manifold 124. The closed loop electrical control system 130 compares one or more of the received signals to signals indicative of, for example, desired pressures and/or temperatures. The closed loop electrical control system 130 can adjust a speed of fan 116, a temperature of heater 120 and/or a temperature of dryer manifold 124, accordingly. In another alternative exemplary embodiment, electrical control system 130 is a combination of open loop and closed loop system.

II. Example Embodiment

Figure 2:
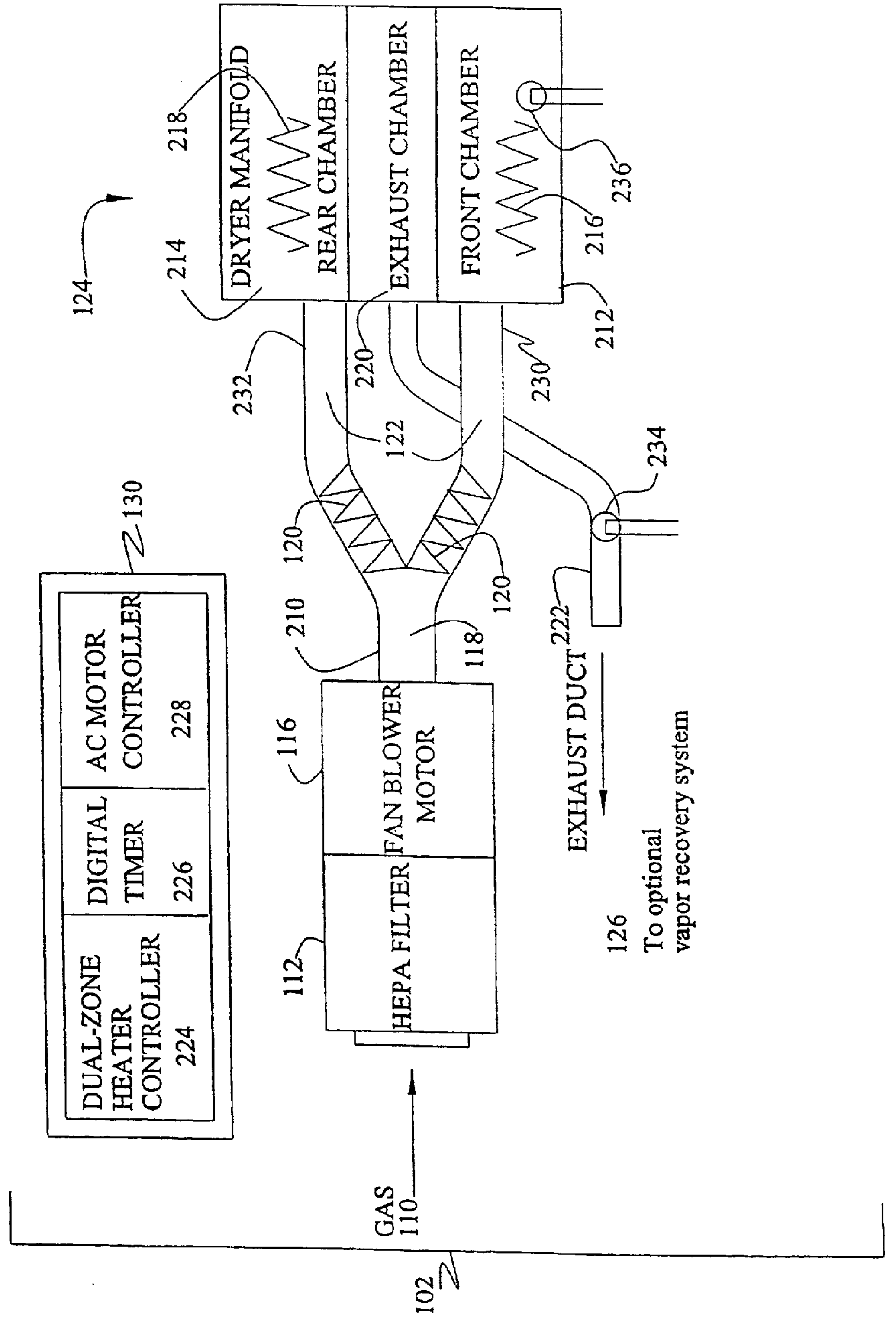
FIG. 2 illustrates a detailed high-level block diagram of an exemplary embodiment of the drying system illustrated in FIG. 1.

Referring to FIG. 2, a high-level block diagram of an embodiment of drying system 102 is illustrated. In this embodiment, dryer manifold 124 is a dual-manifold assembly that includes a front chamber 212 and a rear chamber 214. Chambers 212 and 214 each hold a plurality of vessels (not shown in FIG. 2) that contain solutions to be dried. The vessels can be arranged in a plurality of arrays of vessels. Chambers 212 and 214 receive gas 122 through a duct system 210.

Filter 112 is illustrated as a high extraction particulate air (HEPA) filter. HEPA filters are well known in the relevant art. A variety of types of HEPA filters can be employed, as would be apparent to one skilled in the relevant art.

Fan 116 is illustrated as a fan blower motor that draws gas 110 through HEPA filter 112 and outputs pressurized, filtered gas 118. Fan blower motor 116 can be a variety of commercially available, off-the-shelf fan blower motors. Alternatively, fan blower motor 116 can be custom designed to desired specifications.

One skilled in the relevant art will recognize that a variety of combinations of off-the-shelf or custom HEPA filters 112 and fan blower motors 116 can be employed in the present invention. Conventional, off-the-shelf systems that combine a HEPA filter 112 with a fan blower motor 116 can also be used.

Figure 19:
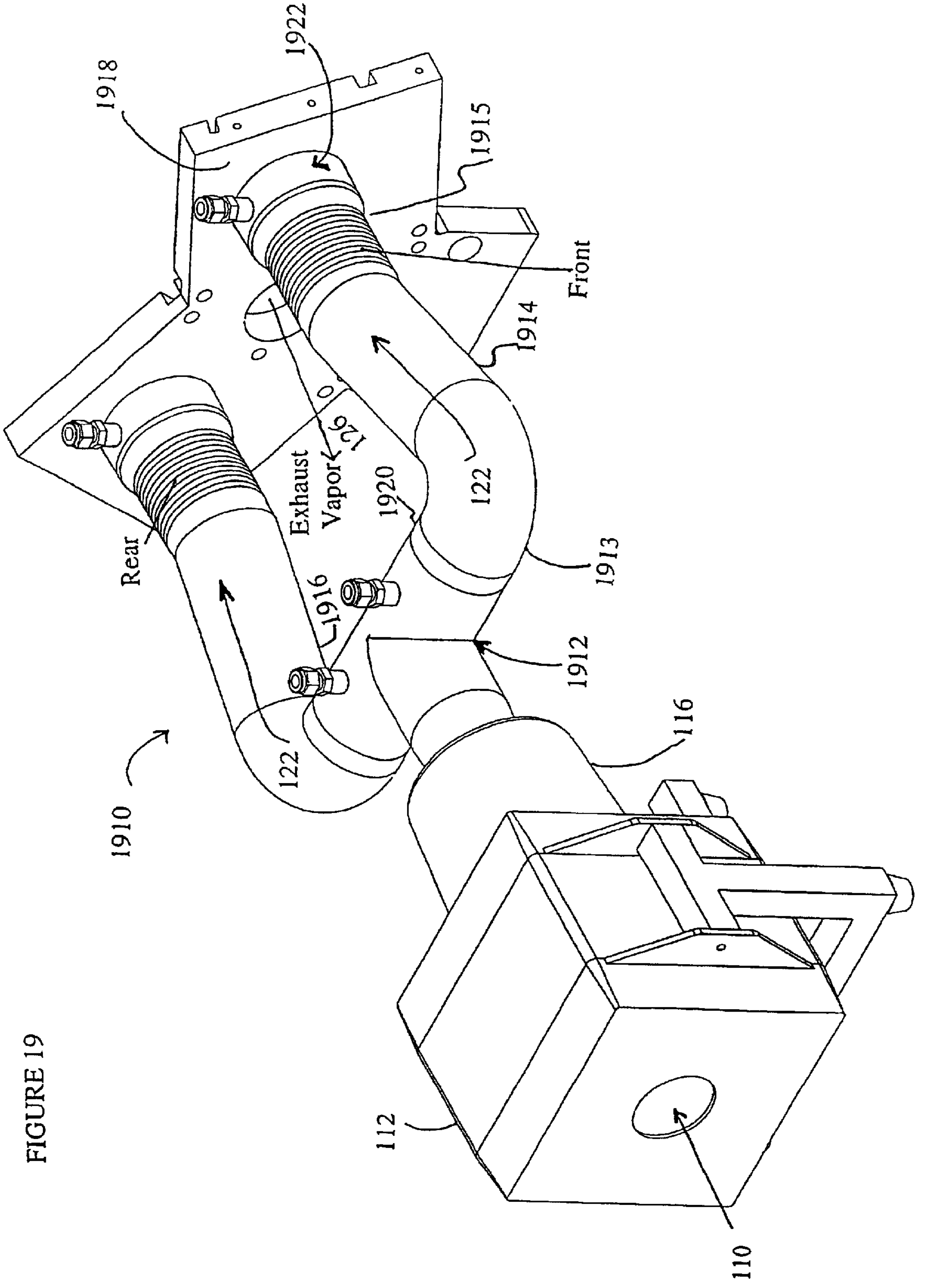
FIG. 19 illustrates a perspective view of a T-branch duct system that can be employed in the present invention.
Figure 20:
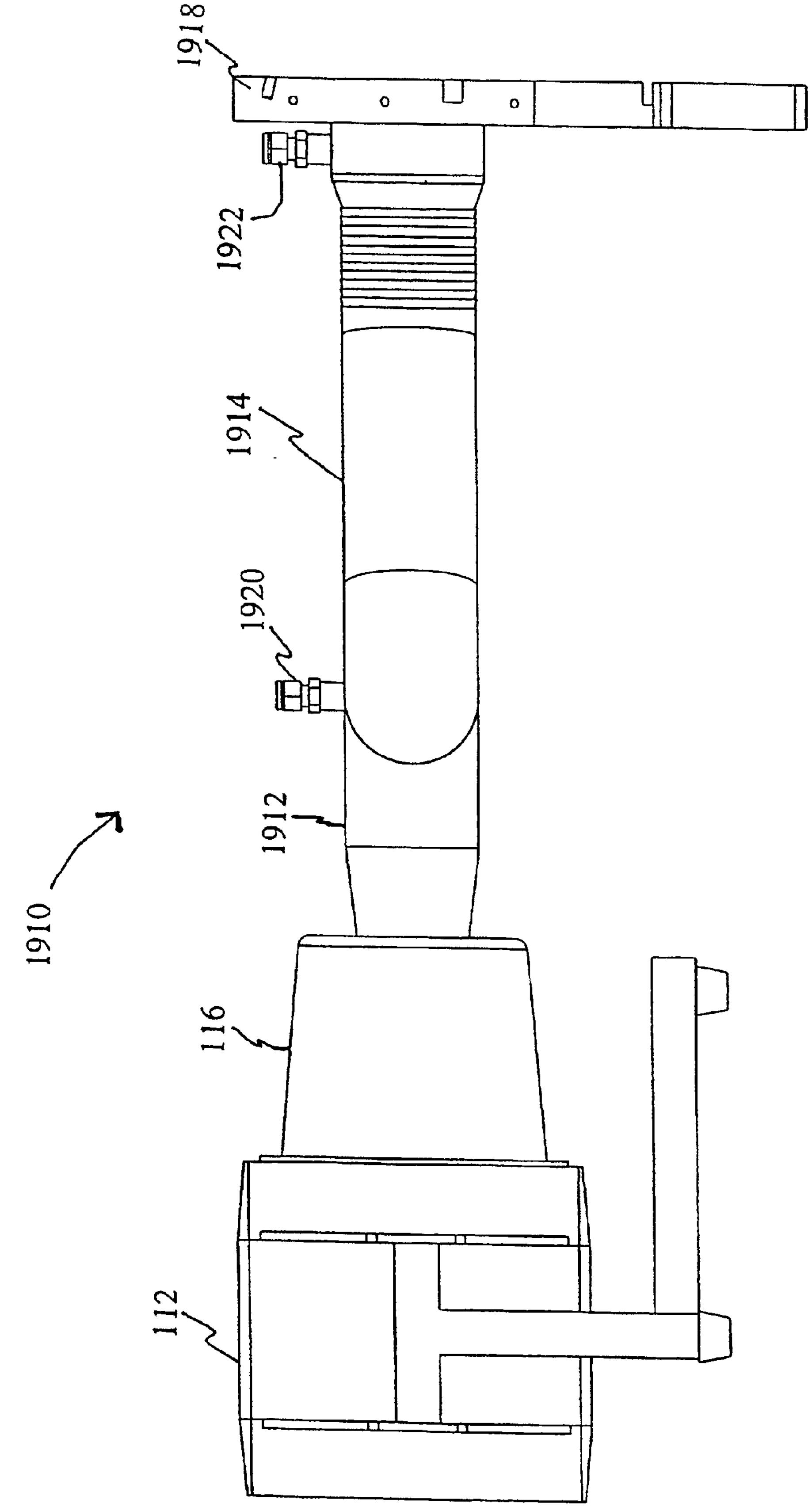
FIG. 20 is a front plan view of the T-branch duct system illustrated in FIG. 19.
Figure 21:
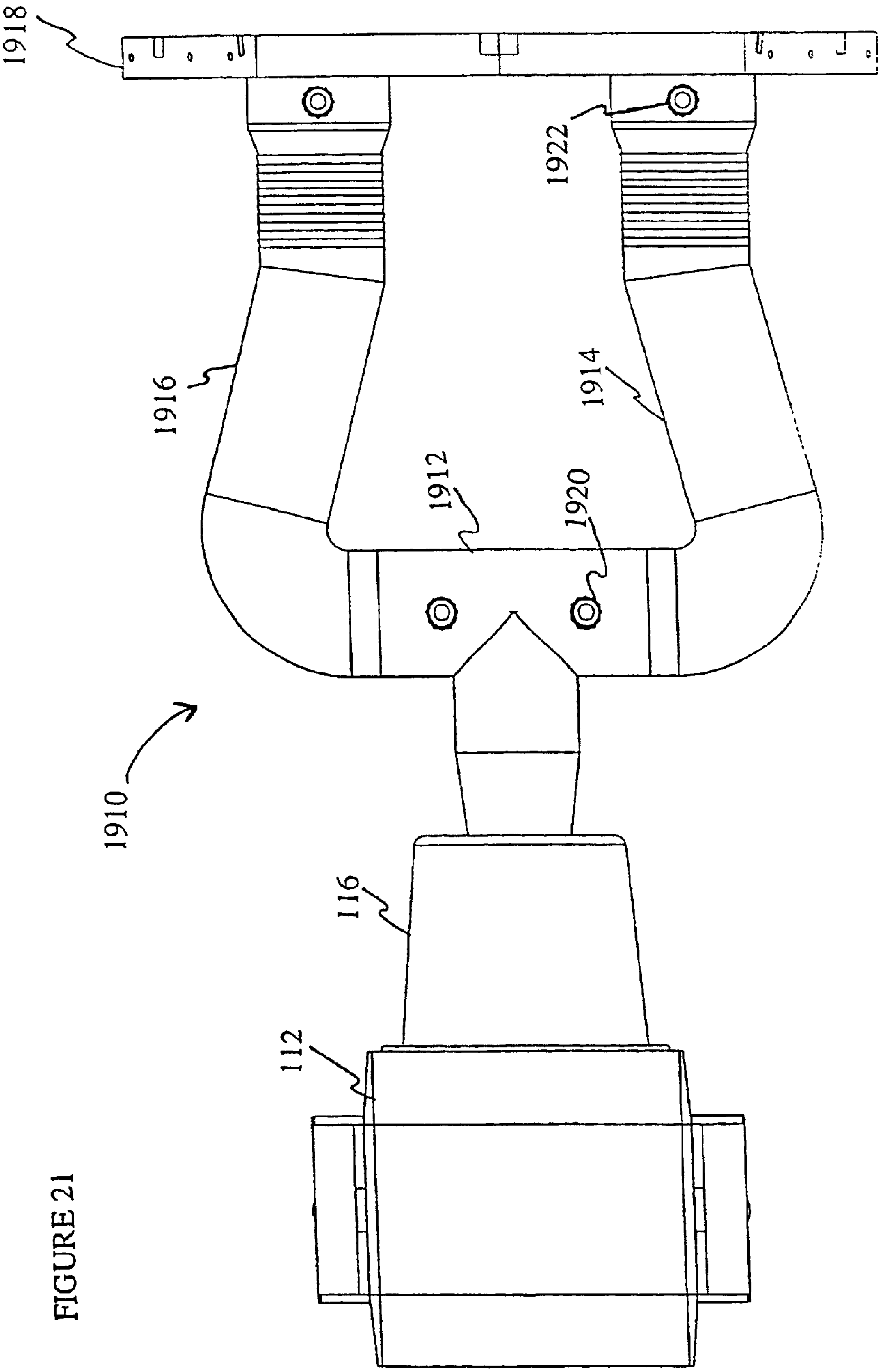
FIG. 21 is a top plan view of the T-branch duct system illustrated in FIGS. 19 and 20.

Pressurized, filtered gas 118 is provided to duct system 210. Referring to FIGS. 19–21, an exemplary embodiment of duct system 210 is illustrated as a T-branch duct system 1910. T-branch duct system 1910 includes a common branch (T-branch) 1912 that divides filtered, pressurized gas 118 between a front branch 1914 and a rear branch 1916. Branches 1914 and 1916 can be constructed from, for example, three inch diameter flexible silicone duct tubes. Other diameters can be used, as would be apparent to one skilled in the relevant art. Actual dimensions can vary with implementations.

A first end 1913 of front branch 1914 can be adjustably coupled to T-branch 1912 by a compression fitting 1920. A second end 1915 of front branch 1914 can be adjustably coupled to an end plate 1918 of dryer manifold 124 by a compression fitting 1922. Rear branch 1916 can be coupled between T-branch 1912 and end plate 1918 in a similar fashion.

Figure 22:
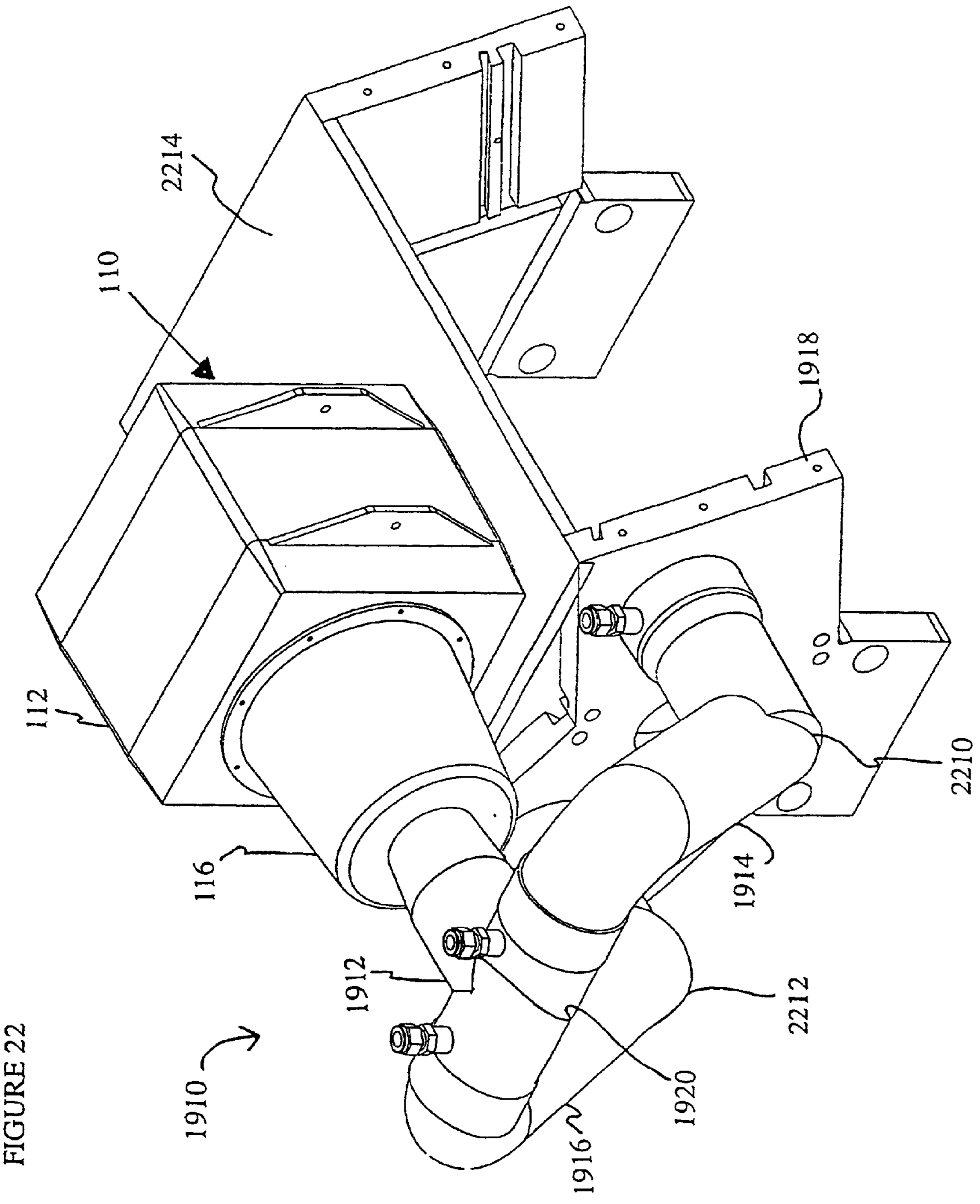
FIG. 22 illustrates a perspective view of a small footprint drying system that employs the T-branch duct system of FIGS. 20 and 22.
Figure 23:
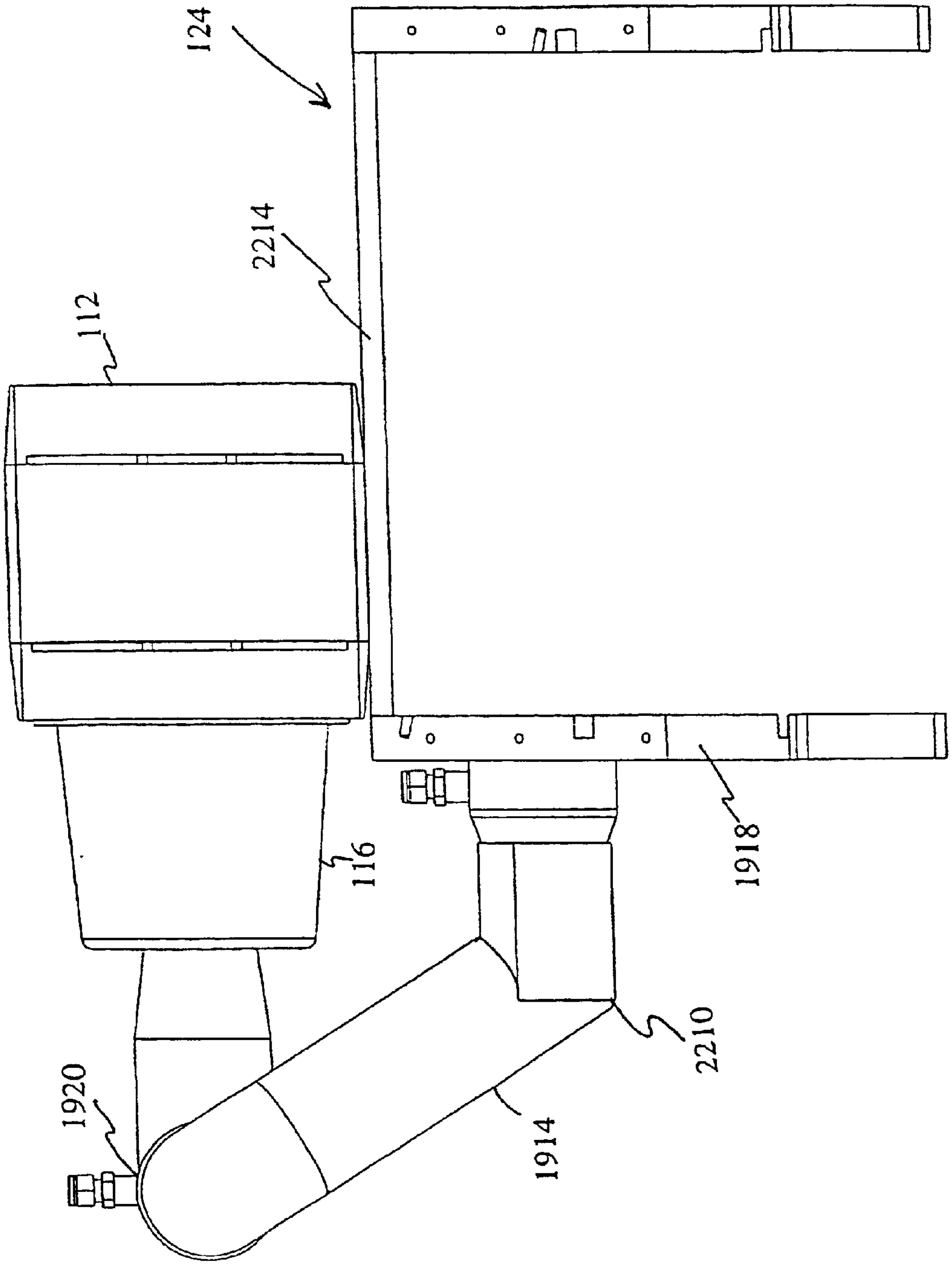
FIG. 23 illustrates a front plan view of the system illustrated in FIG. 22.
Figure 24:
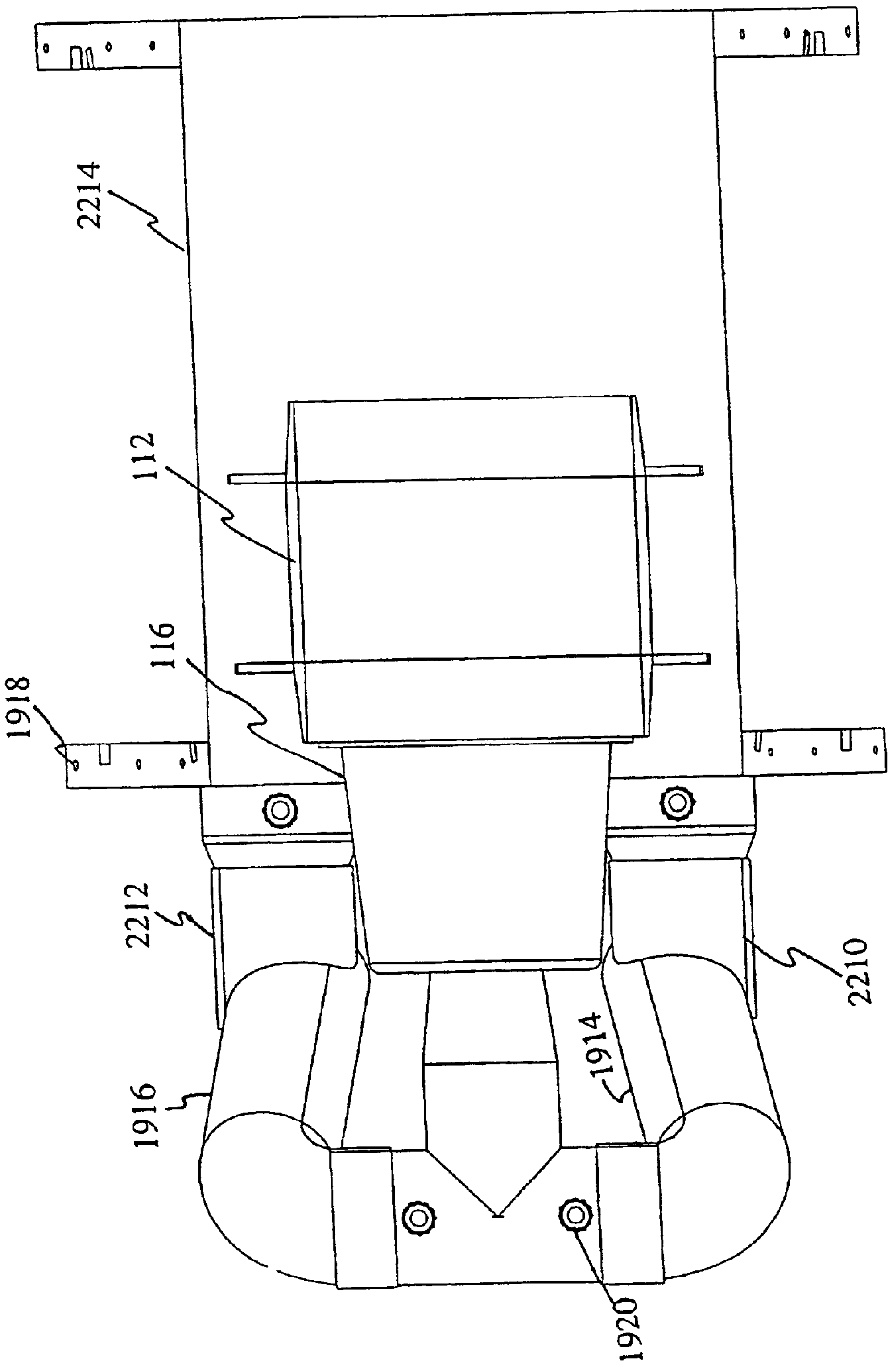
FIG. 24 illustrates atop plan view of the system illustrated in FIGS. 22 and 23.

Referring to FIGS. 22–24, in an exemplary embodiment, T-branch duct system 1910 can be configured so that HEPA filter 112 and/or fan 116 rest on a top plate 2214 of dryer manifold 124 (FIGS. 5–7, 9 and 10). In this embodiment, front branch 1914 includes a pivoting section 2210 that permits front branch 1914 to pivot with respect to end plate 1918. Likewise, adjustable compression fitting 1920 permits T-branch 1912 to pivot with respect to front branch 1914. Rear branch 1916 includes a similar pivoting section 2212. This configuration reduces the overall footprint of system 102.

Figure 3A:
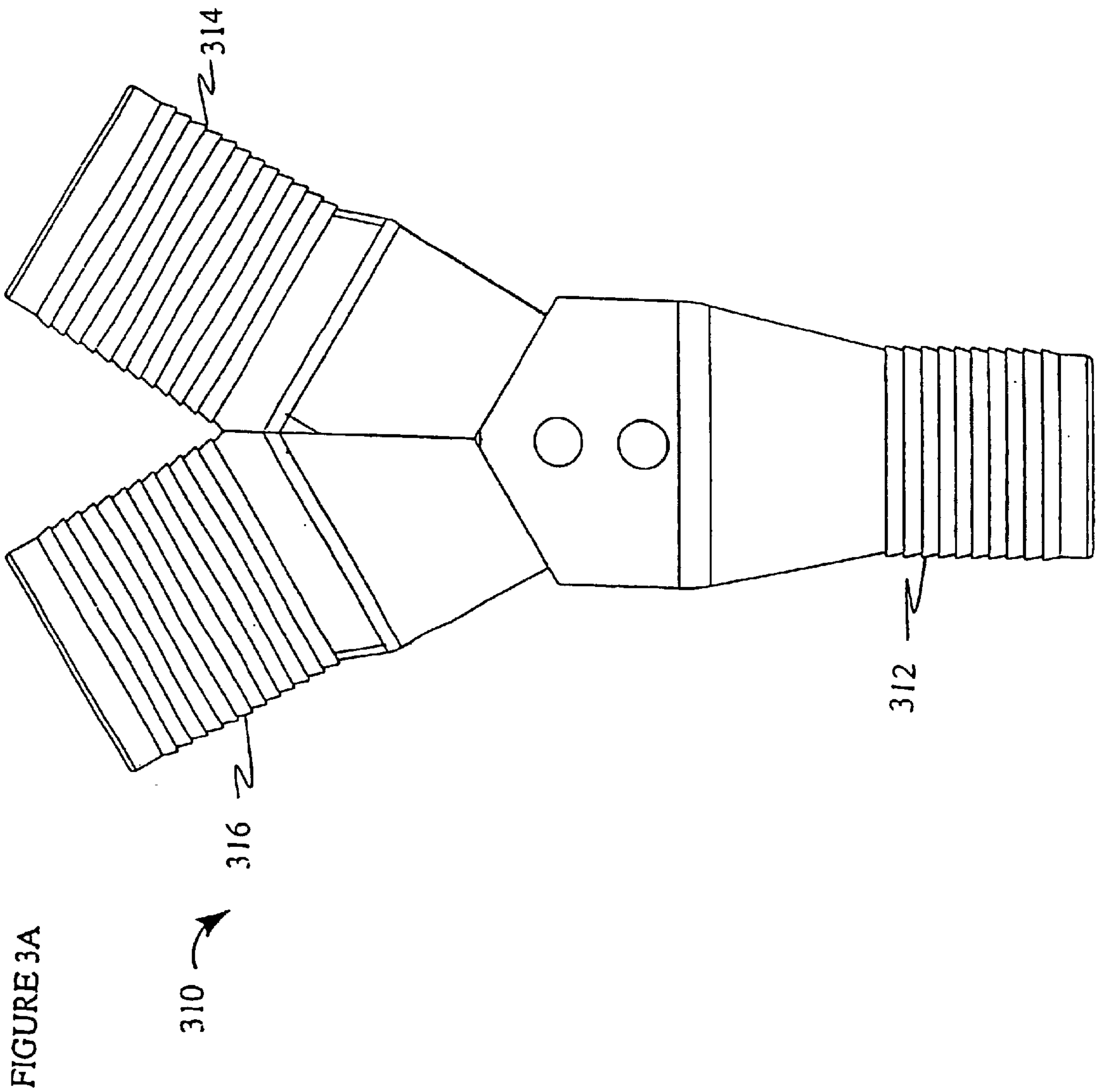
FIG. 3A illustrates a top, plan view of a Y-branch duct system that can be employed in the present invention.
Figure 3B:
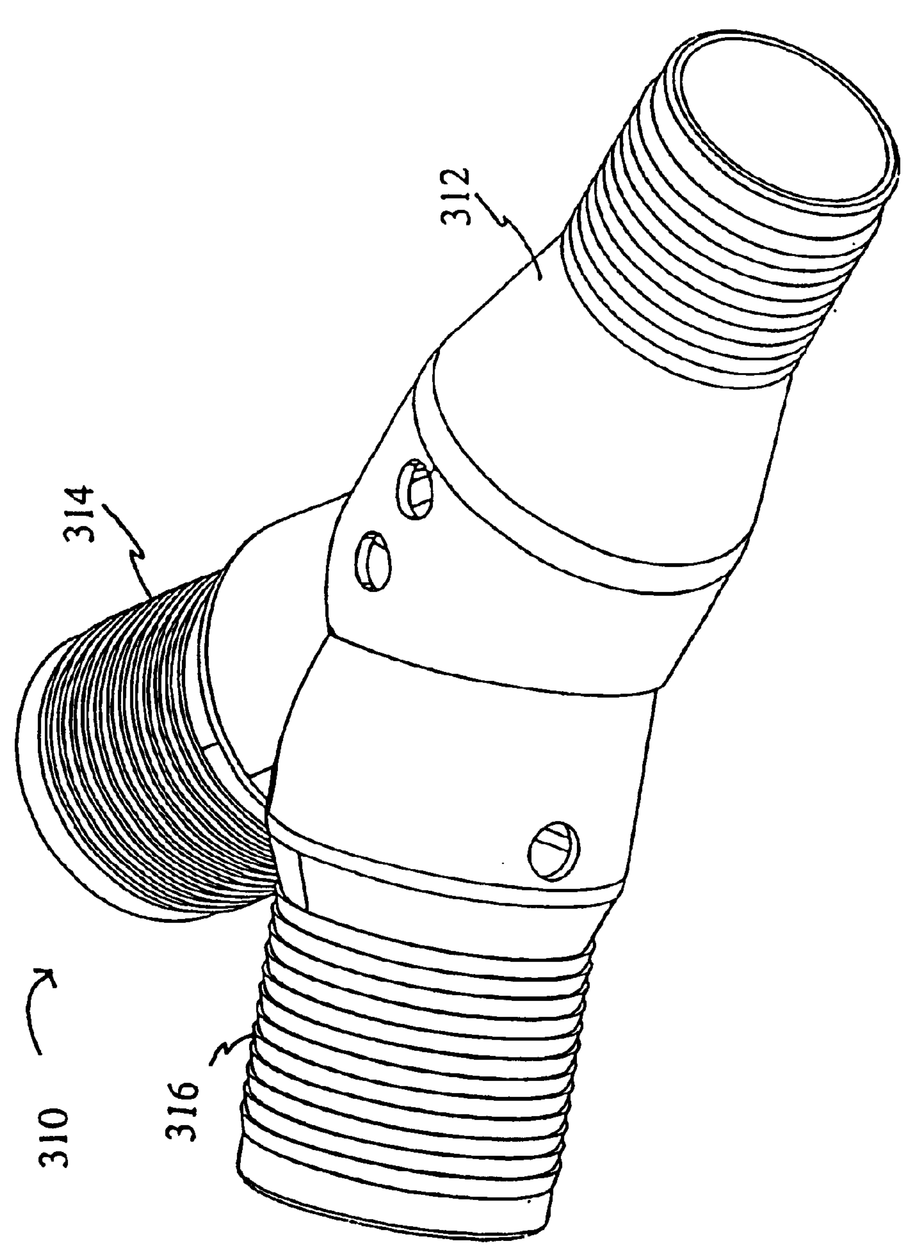
FIG. 3B illustrates a perspective view of the Y-branch duct system illustrated in FIG. 3A.

Referring to FIGS. 3A and 3B, in an alternative exemplary embodiment, duct system 210 is illustrated as a Y-branch duct system 310. Y-branch duct system 310 includes a common branch (Y-branch) 312 that receives and divides gas 118 between a front branch 314 and a rear branch 316.

Referring back to FIG. 2, duct system 210 can include a first heater 120 in a front branch 230 and a second heater 120 in a rear branch 232. Front branch 230 can be front branch 1914 of T-branch duct system 1910 or front branch 312 of Y-branch duct system 310. Rear branch 232 can be rear branch 1916 of T-branch duct system 1910 or rear branch 314 of Y-branch duct system 310. A single heater 120 (not shown) could be provided in front branch 230 and rear branch 232.

Heater(s) 120 can be a variety of conventional, off-the-shelf heaters, such as geometrically-reformable heaters available from Watlow Electrical Manufacturing Co. of St. Louis, Mo. Geometrically-reformable heaters can be formed into a variety of shapes, such as a compact coiled nozzle, a straight cable, a flat spiral, a star-wound, etc. Heater(s) 120 can be secured within duct system 210 with a variety of conventionally known techniques, such as bolts, screws, epoxy, etc.

Duct system 210 provides gas 122 to chambers 212 and 214. Duct system 210 provides scalability in that a plurality of drying chambers can be employed to dry solutions in vessels. One skilled in the relevant art will recognize that a variety of types of duct systems 210 can be employed.

In an exemplary embodiment, chambers 212 and 214 include heaters 216 and 218, respectively, for heating the vessels. Heaters 216 and 218 can be a variety of conventional, off-the-shelf heaters. For example, heaters 216 and 218 can include tapes, mats, fine-strand resistance wires insulated and enclosed in high-strength, high-temperature-resistant silicone rubber, etc. Silicone rubber heaters are available as tapes and mats from, for example, Cole-Parmer Instrument Company, of Vernon Hills, Ill. A silicone heating mat, available from Cole-Parmer as part no. E-03125-50, for example, can be used.

In operation, gas 110 is provided to front chamber 212 and to rear chamber 214 by front and rear branches 230 and 232, respectively, of duct system 210. Gas 110 is passed over the solutions to be dried and into an exhaust chamber 220 as exhaust vapors 126. Exhaust vapors 126 are removed from exhaust chamber 220, via an exhaust duct 222. Exhaust duct 222 can include an optional exhaust fan (not shown). Exhaust vapors 126 can be sent to an optional vapor recovery system 128 (not shown in FIG. 2).

Electrical control system 130 controls one or more of fan 116 and heaters 120, 216 and 218. Electrical control system 130 can include, for example, one or more dual-zone heater controllers 224 to control heaters 120, 216 and 218. Electrical control system 130 can also include an AC motor controller 228 to control fan blower motor 116.

A pressure switch (not shown) can be provided downstream of fan 116 to measure the pressure of gas 118 or 122. In an embodiment, electrical control system 130 does not energize heaters 120, 216 and 218 until a predetermined pressure is sensed by the pressure switch. This prevents heat-induced damage to system 102 in the event that fan blower motor 116 fails.

Electrical control system 130 can include a digital timer 226 to delay sampling of the pressure switch for a predetermined period of time. This provides fan blower motor 116 with the predetermined period of time to get up to speed before electrical control system 130 can declare a low pressure fault.

A. Dryer Manifold 124

Figure 5:
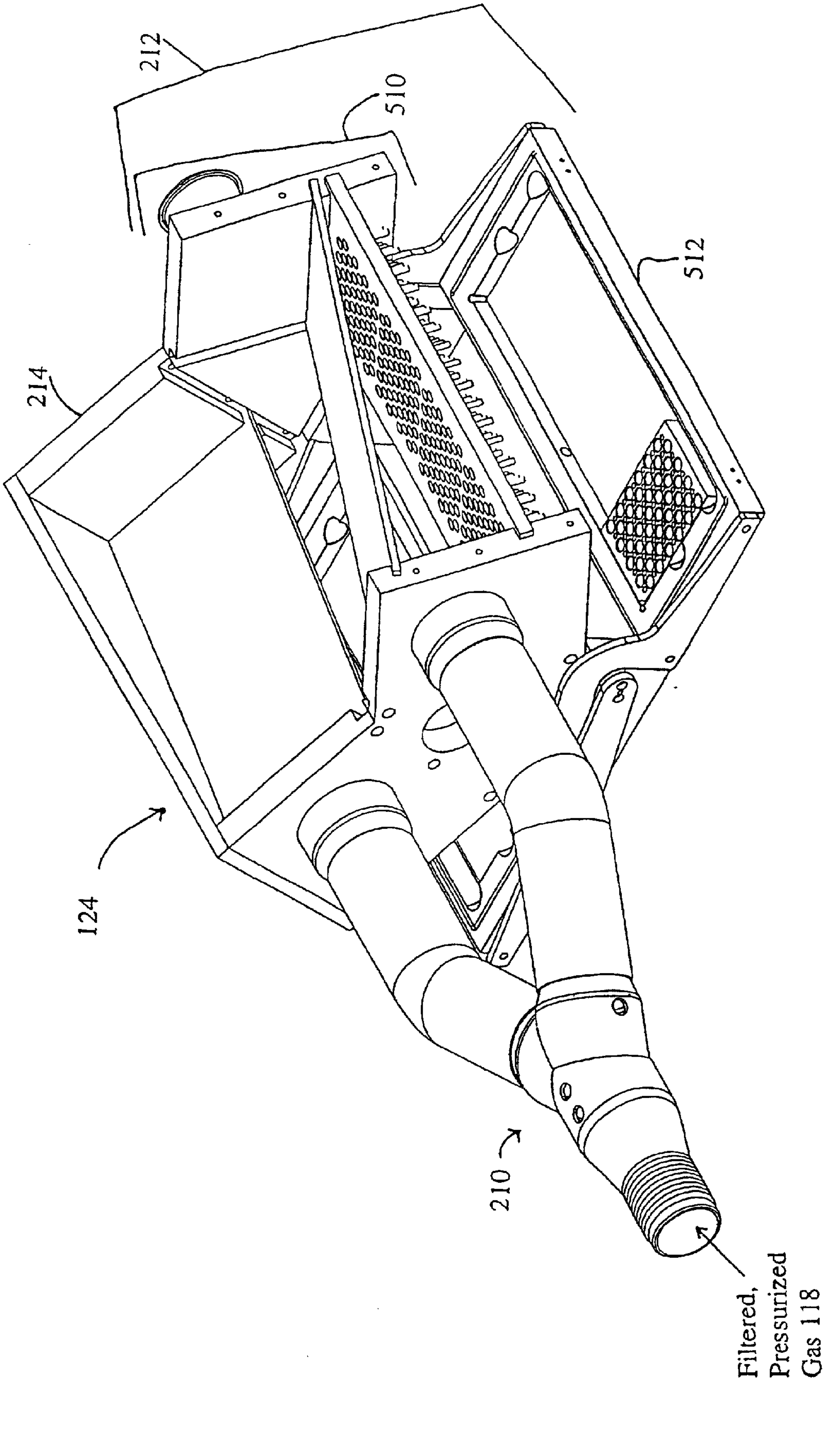
FIG. 5 illustrates a first perspective view of a dual-chamber dryer manifold and the y-branch duct system, in accordance with the present invention.
Figure 6:
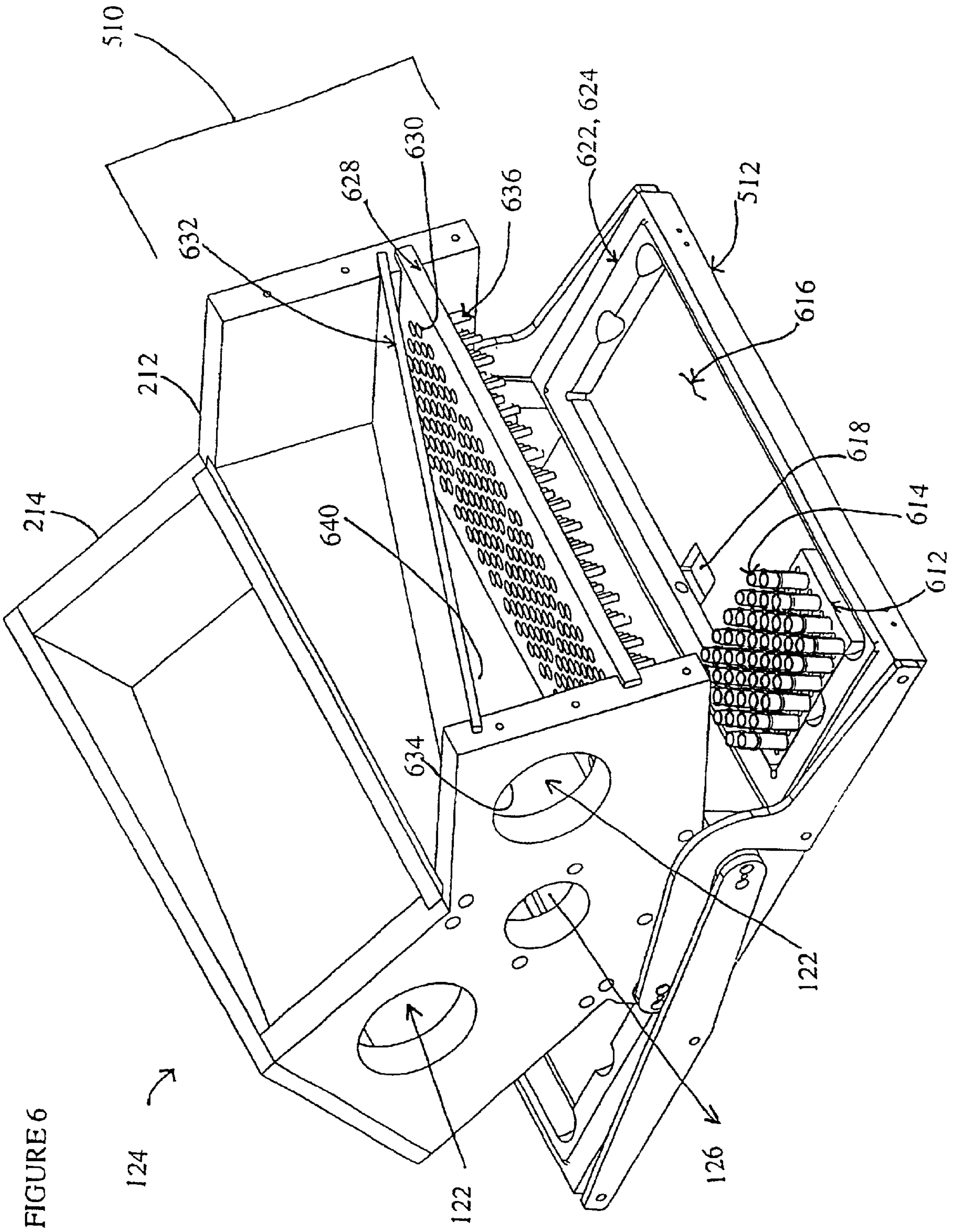
FIG. 6 illustrates a second perspective view of the dryer manifold illustrated in FIG. 5.
Figure 7:
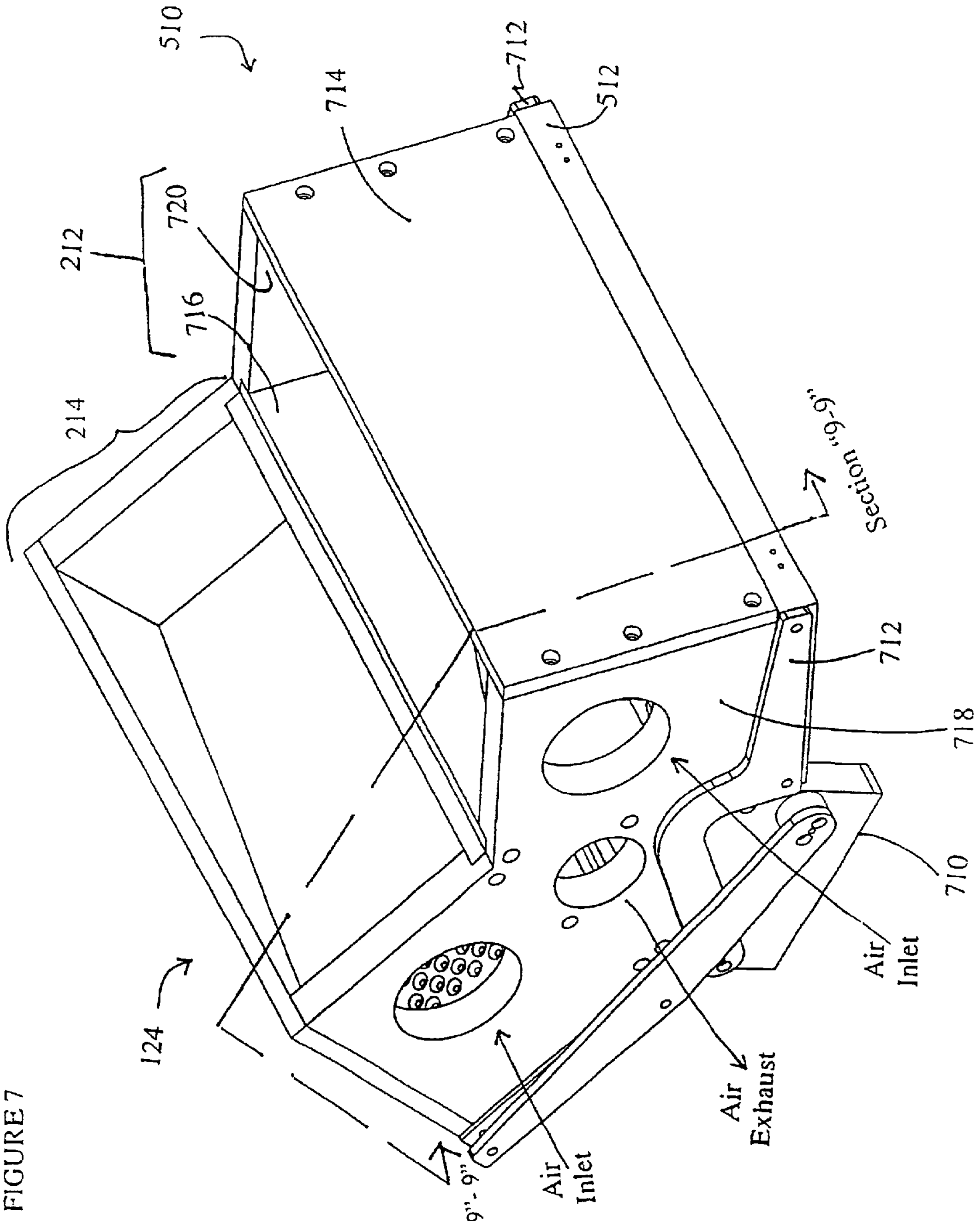
FIG. 7 illustrates a third perspective view of the dryer manifold illustrated in FIGS. 5 and 6.

Referring to FIGS. 5, 6 and 7, dryer manifold 124 is illustrated as a dual-chamber dryer manifold, including front chamber 212 and rear chamber 214. Chamber 214 is a substantially mirror image of chamber 212.

FIGS. 5 and 6 illustrate partial cutaway views of dual-chamber dryer manifold 124. Front chamber 212 includes a manifold 510 and a base plate 512.

Figure 8:
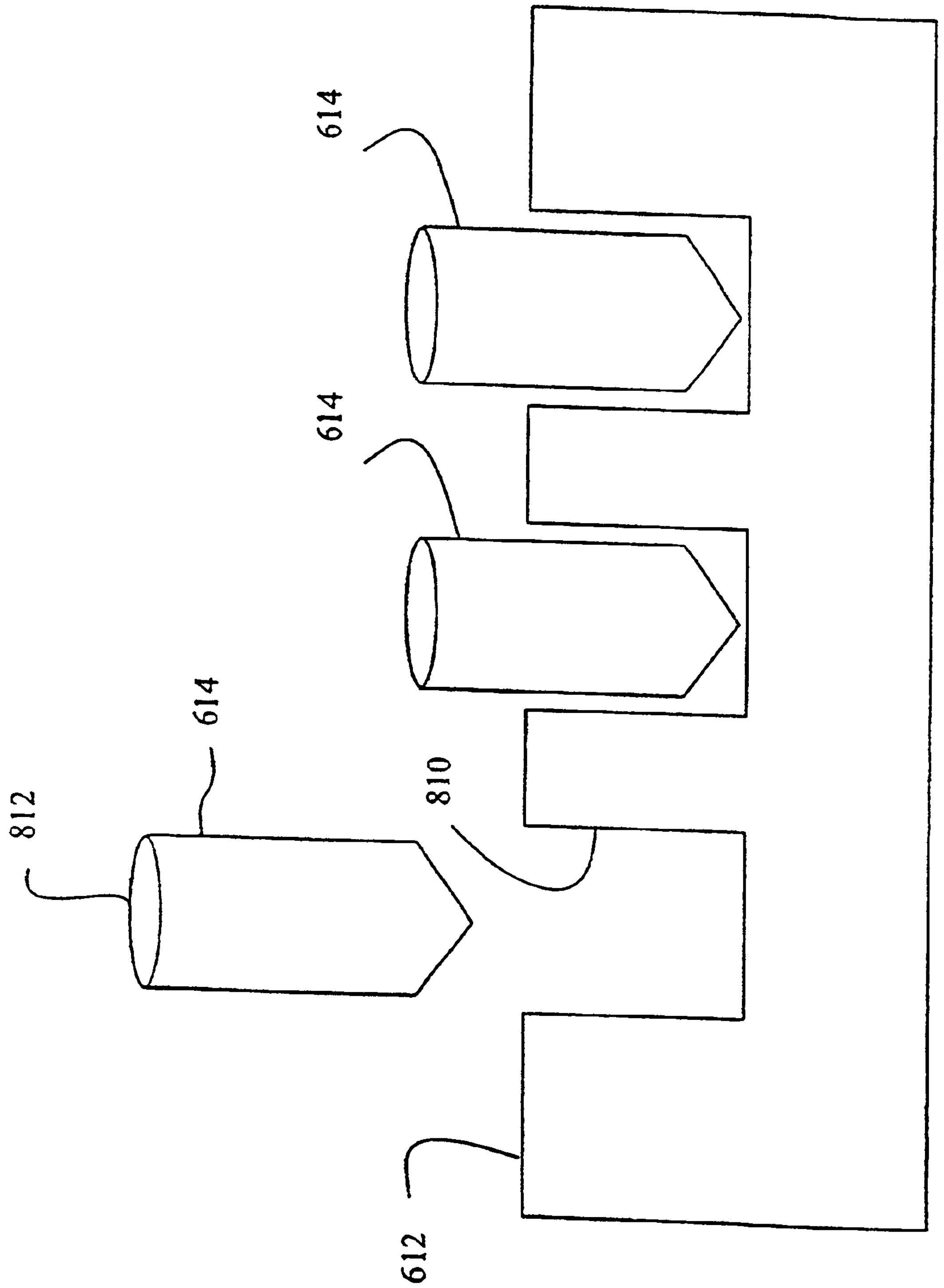
FIG. 8 illustrates a vessel tray that can be employed by the present invention.

Referring to FIG. 6, base plate 512 can hold one or more vessels 614. In an exemplary embodiment, vessels 614 are held by one or more vessel trays 612. Vessel trays 612 can be removably placed on base plate 512. Referring to FIG. 8, vessel trays 612 can include an array of vessel cavities 810 that receive vessels 614. Vessels 614 can be press-fitted vessels that are held in place by friction. Vessels 614 can be made from, for example, thermoplastics and/or metal and can be, for example thin-walled stainless steel vessels.

Figure 26:
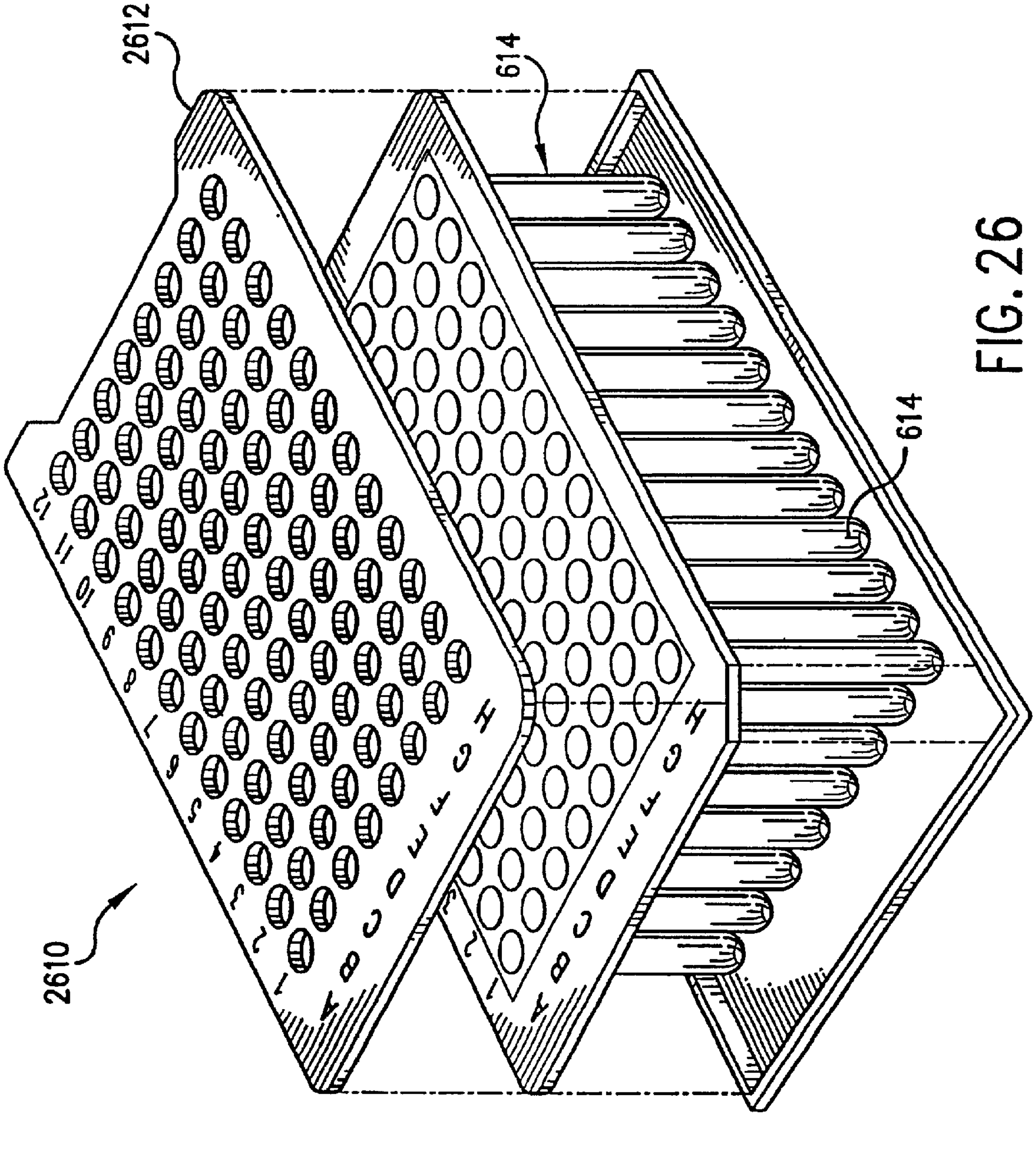
FIG. 26 illustrates an array of vessels that can be used to hold solutions to be dried.

Referring to FIG. 26, in an embodiment, an array of vessels 614 can be provided as one or more deep-well plates of vessels 2610, such as deep-well plates available from Beckman Instruments, Inc. of King of Prussia, Pa. For example, part number 227006 from Beckman Instruments includes an array of twenty-four, one milliliter wells. A lid 2612 can be used to seal vessels 2612 when solutions in deep well plate 2610 are not being dried.

Referring back to FIG. 6, base plate 512 can include a recessed portion 616 for receiving one or more of vessels 614, vessel trays 612, deep well plates 2610, etc. Recessed portion 616 can be designed to receive any number vessels 614, vessel trays 612, deep well plates 2610, etc. Vessel trays 612 and deep well plates 2610 can hold any number of vessels 614. Base plate 512 can include a recessed perimeter 622 for receiving a seal, such as a silicone o-ring seal 624.

In an exemplary embodiment, dryer manifold 124 heats solutions in vessels 614. For example, base plate 512 can include a heater 216 to heat solutions in vessels 614. Heater 216 can be implemented as, for example, a thin, silicone-sealed heating pad placed in recessed portion 616 so that vessel trays 612 rest thereon. The heating pad can be connected to an electrical source via leads 618. Alternatively, any other suitable heat source can be used to heat solutions in vessels 614. For example, solutions in vessels 614 can be heated with a radiant heater (not shown), a heating coil embedded within base plate 512 (not shown), etc.

Base plate 512, vessel trays 612 and/or deep-well plates of vessels 2610 can be fabricated from metals such as aluminum alloys and coated aluminum alloys, from thermoplastics such as polypropylene and that sold by DuPont Co. of DE under the trademark Delrin, etc., or combinations thereof. Where dryer manifold 124 heats solutions in vessels 614, one or more portions dryer manifold 124 are preferably manufactured from materials that do not readily transfer heat (eg., thermoplastics, etc.). This ensures better control over heating of solutions in vessels 614.

Referring to FIG. 7, dryer manifold 124 includes a base 710. Base 710 is common to front and rear chambers 212 and 214. In the illustrated embodiment, base plate 512 is hingedly coupled to base 710 by hinges 712. Hinges 712 provide dryer manifold 124 (or base plate 512) with an open position and a closed position. In both FIG. 5 and FIG. 6, base plate 512 is illustrated in the open position. In FIG. 7, base plate 512 is illustrated in the closed position. When in the closed position, base plate 512 is sealing engagement with manifold 510.

In an exemplary embodiment, manifold 510 includes a front wall 714, a rear wall 716, a first end wall 718 and a second end wall 720. In the illustrated embodiment, front chamber 212 has rectangular shape. Alternatively, front chamber 212 can be designed in a variety of other shapes.

Figure 10:
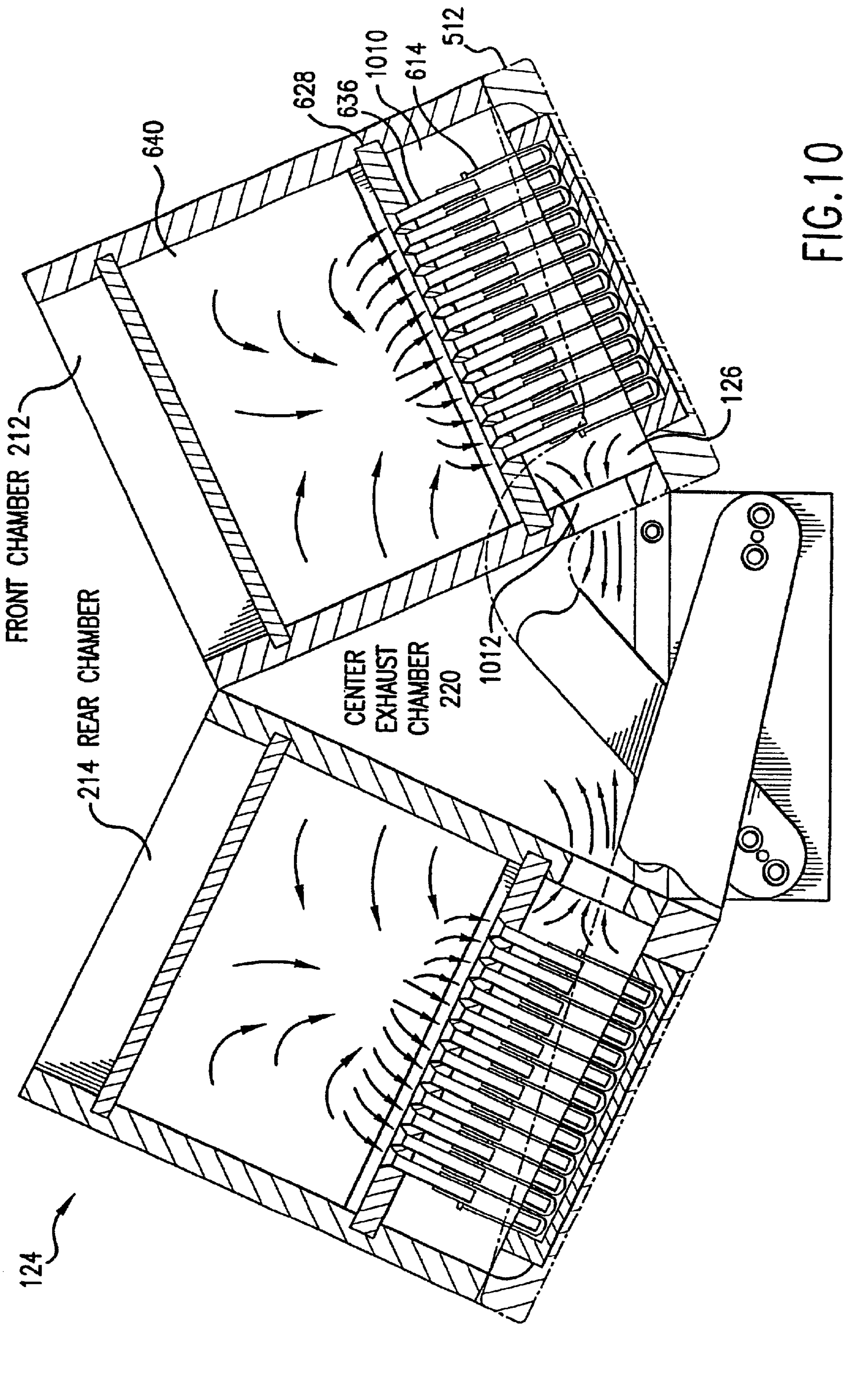
FIG. 10 illustrates a partially sectional view of the dryer manifold taken along the line 9—9 in FIG. 7.

Referring back to FIG. 6, manifold 510 includes a nozzle plate 628 which has an array of passages 630. Manifold 510 also includes a baffle plate 632 that guides gas 110 from an inlet 634 through passages 630. Baffle plate 632 and nozzle plate 628 define a plenum 640 therebetween. Referring to FIG. 10, when base plate 512 is in the closed position, nozzle plate 628 and base plate 512 form a cavity 1010 therebetween.

Referring back to FIG. 6, nozzle plate 628 includes hollow tubes 636 extending downwardly from passages 630. Referring to FIG. 10, dryer manifold 124 is designed so that, when base plate 512 is in the closed position, hollow tubes 636 extend into vessels 614, without touching vessels 614 or the solutions therein.

In operation, gas 110 passes through inlet 634 and into plenum 640, where baffle plate 632 forces gas 110 downwardly through passages 630 and through hollow tubes 636. Preferably, hollow tubes 636 do not extend so far into vessels 614 that they contact the solution to be dried. Instead, gas 110 is emitted under pressure from hollow tubes 636 and passes over the surface of the solutions to be dried. As gas 110 passes over the surface of the solutions to be dried, the solutions evaporate, generating exhaust vapors 126. Exhaust vapors 126 pass through an exhaust passage 1012, into exhaust chamber 220 and out an exhaust 642 (FIG. 6).

In an exemplary embodiment, baffle plate 632 is at an angle of 14.25 degrees relative to nozzle plate 628. This ensures adequate gas flow through all of passages 630. The angle can, however, be set or adjusted to any suitable angle.

Figure 11:
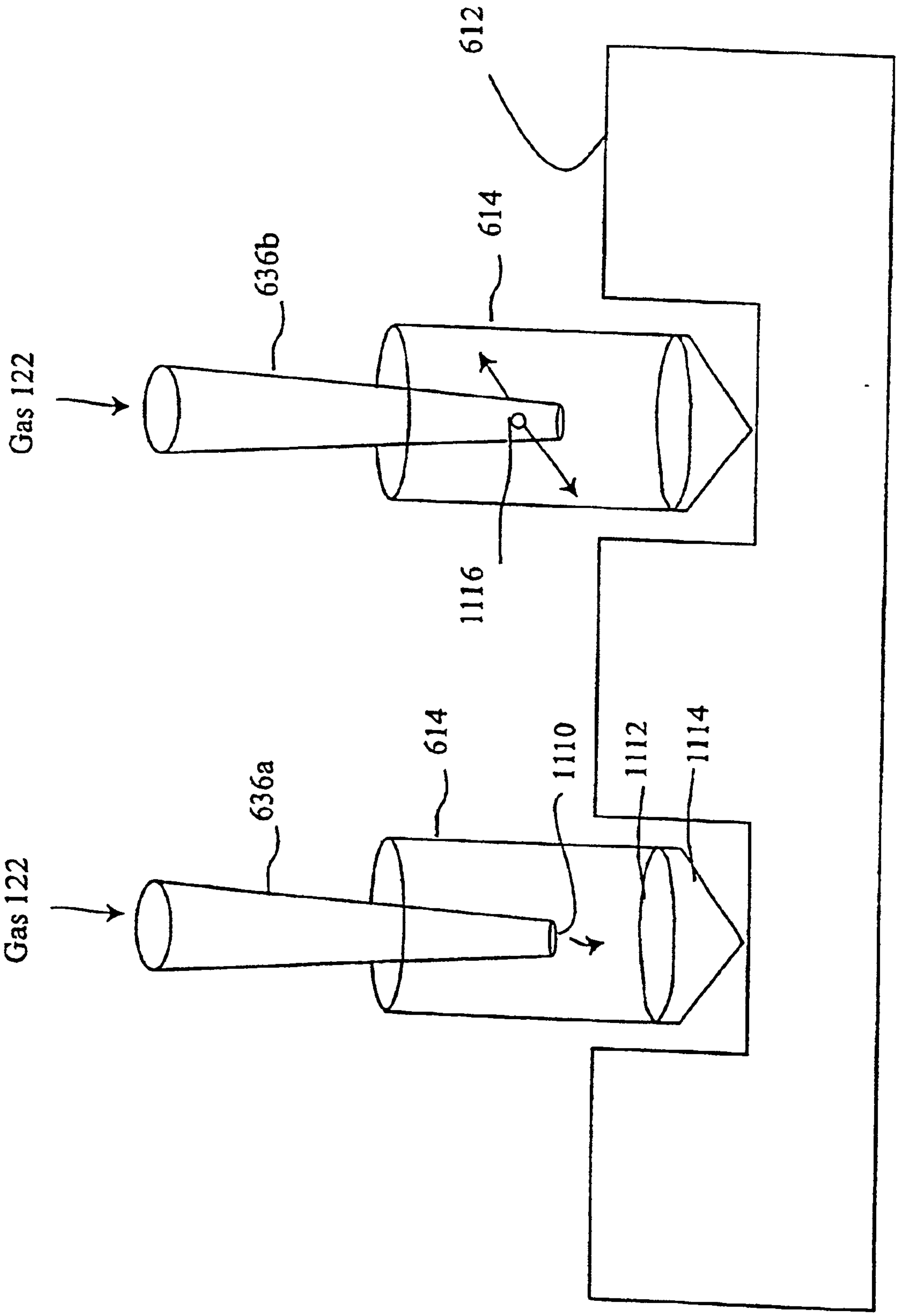
FIG. 11 illustrates downwardly extending hollow tubes that can be employed by the present invention.

Referring to FIG. 11, downwardly extending hollow tubes 636 can be fashioned in a variety of designs. In an exemplary embodiment, a hollow tube **636*a* includes a substantially downwardly directed opening 1110 that directs gas 110 substantially at a surface 1112 of solution 1114. In another exemplary embodiment, a hollow tube 636*b*, includes one or more horizontally directed openings 1116 that direct gas 110 substantially horizontal to surface 1112. Hollow tube 636*b* can be employed, for example, to reduce foaming and bumping of solution 1114. Openings 1110 and 1116** can be combined on a single hollow tube (not shown). One skilled in the relevant art will recognize that a variety of other options can be employed as well.

Figure 9:
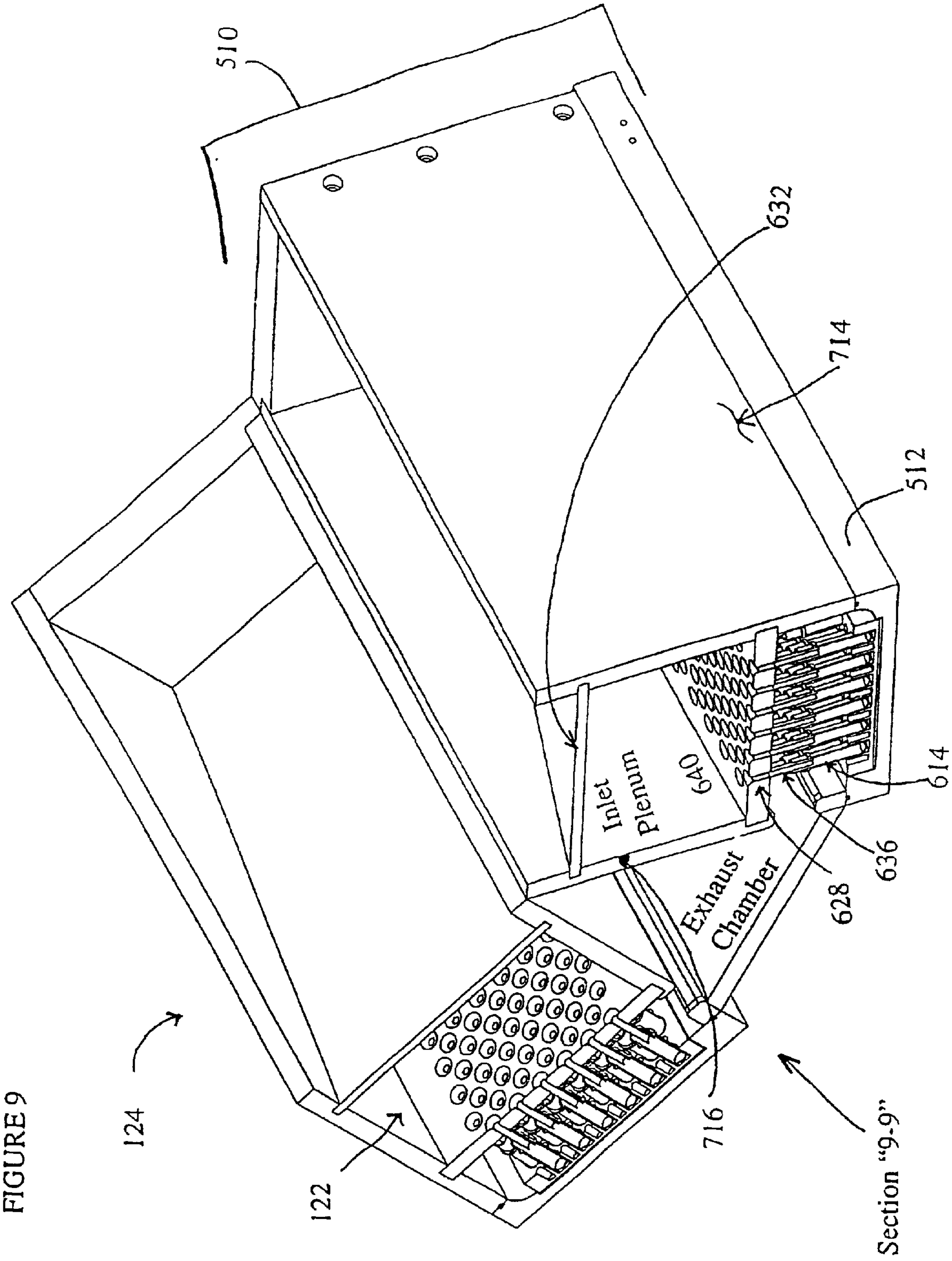
FIG. 9 illustrates a partially sectional view of the dryer manifold taken along a line 9—9 in FIG. 7.
Figure 13:
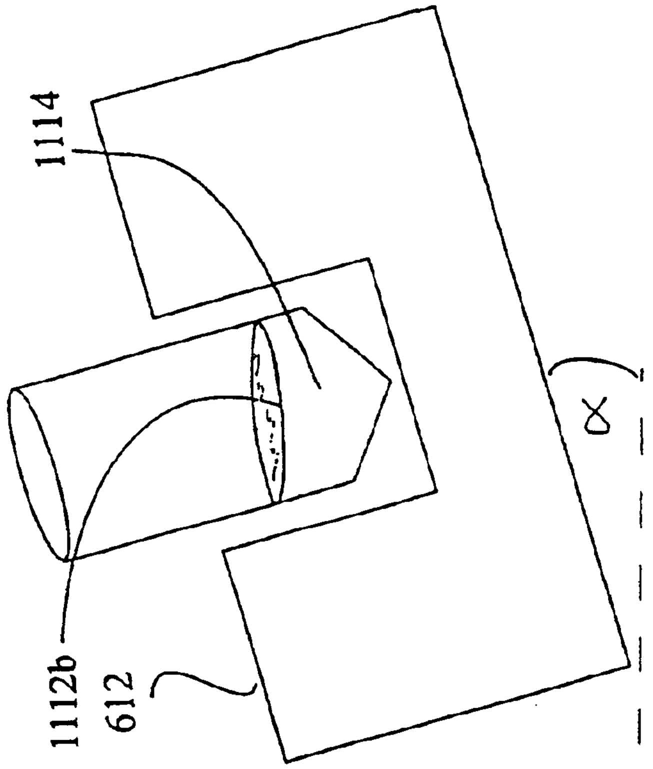
FIG. 13 illustrates the vessel of FIG. 12, tilted at an angle $\alpha$.
Figure 12:
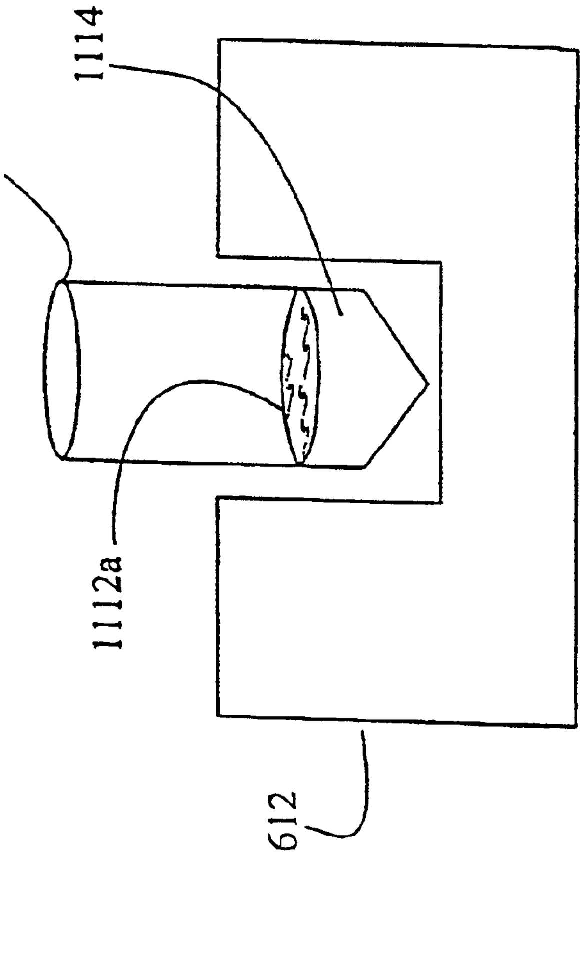
FIG. 12 illustrates a vessel in an upright position holding a solution to be dried.

The present invention can reduce drying times by increasing a surface area of a solution to be dried. Referring to FIG. 12, vessel 614 is illustrated in an upright position. This is the position of vessel 614 when base plate 512 is in the open position, as illustrated in FIGS. 5 and 6. Referring to FIG. 13, vessel 614 is illustrated tilted at an angle $\alpha$. This is the position of vessel 614 when base plate 512 is in the closed position, as illustrated in FIGS. 7, 9 and 10.

Tilting vessels 614 at an angle increases the surface area of the solution to be dried and thus speeds the drying process. When vessel 614 is upright, as illustrated in FIG. 12, solution 1114 has a surface area **1112*a*. When vessel 614 is tilted as illustrated in FIG. 13, surface area 1112*a* increases to 1112*b*. As is well known to those skilled in the art, increasing the surface area of the solution to be dried in vessel 614 increases the rate of evaporation of the solution 1114. In an exemplary embodiment, base plate 512, and hence vessel tray 612 and vessel 614, are tilted at an angle $\alpha$ of twenty-five degrees. Alternatively, $\alpha$ can be any angle so long as solution 1114 does not spill out of vessel 614**.

Through a combination of increasing the surface area 1112 of solutions to be dried, heating solutions to be dried, and directing heated gas over the solutions to be dried, drying times are substantially reduced as compared to conventional systems. For example, the present invention can drys plates of forty-eight vessels, each vessel containing 0.5 ml of aqueous solutions in about forty-five to about sixty minutes. A conventional drying system, such as the type constructed by Savant Instruments, which uses a vacuum pump and centrifuge connected to a refrigerated vapor trap, takes three to four hours to dry the same volumes of aqueous solutions.

B. Vapor Recovery

In an exemplary embodiment of the present invention, a vapor recovery system is used to capture exhaust 126 vapors that are evaporated from solution 1114 and/or that are introduced by gas 110. Referring to FIGS. 1 and 2, a conventional vapor recovery system 128 can be provided downstream of exhaust chamber 220. In addition, or alternatively, coaxial vapor recovery systems can be employed to prevent exhaust vapors 126 from one vessel 614 from interacting with solutions in another vessel 614. Coaxial vapor recovery systems also serve to prevent solution loss and contamination from foaming and bumping.

Figure 25:
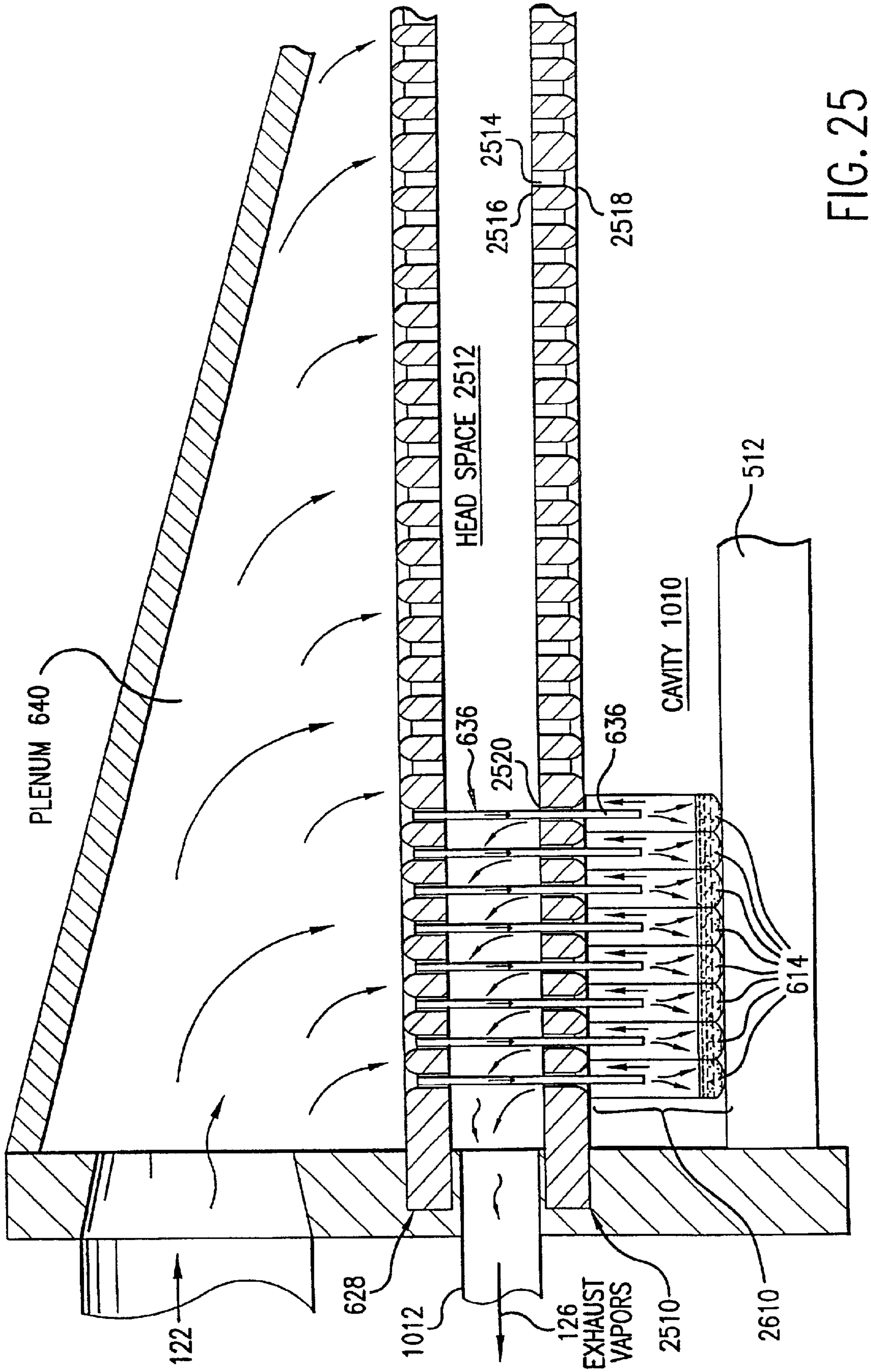
FIG. 25 illustrates a vapor recovery plate that can be employed to reduce contamination of solutions in vessels.

Referring to FIG. 25, in an exemplary embodiment, a vapor recovery plate 2510 is disposed with front chamber 212, below and substantially parallel to nozzle plate 628, forming a head space 2512 therebetween. Vapor recovery plate 2510, and passages 2514 therethrough, are designed to reduce or eliminate exhaust vapors 126 from a vessel 614 from entering, and possibly contaminating, another vessel 614. Vapor recovery plate 2510 includes an array of passages 2514, each having a first end 2516 that opens to head space 2512 and a second end 2518 that opens to cavity 1010. The shape and size of second end 2518 substantially matches the shape and size of an opening 812 (FIG. 8) of vessels 614. When base plate 512 is in the closed position, vapor recovery plate 2510 forms a tight, compression-like fit with vessels 614. Hollow tubes 636 extend through passages 2514 so that gas 122 passes from plenum 640, through tubes 636 and into vessels 614. Exhaust vapors 126 rise from vessels 614 through passages 2514 (outside of hollow tubes 636) and into head space 2512. From head space 2512, exhaust vapors 126 exit through exhaust passages 1012.

Figure 14:
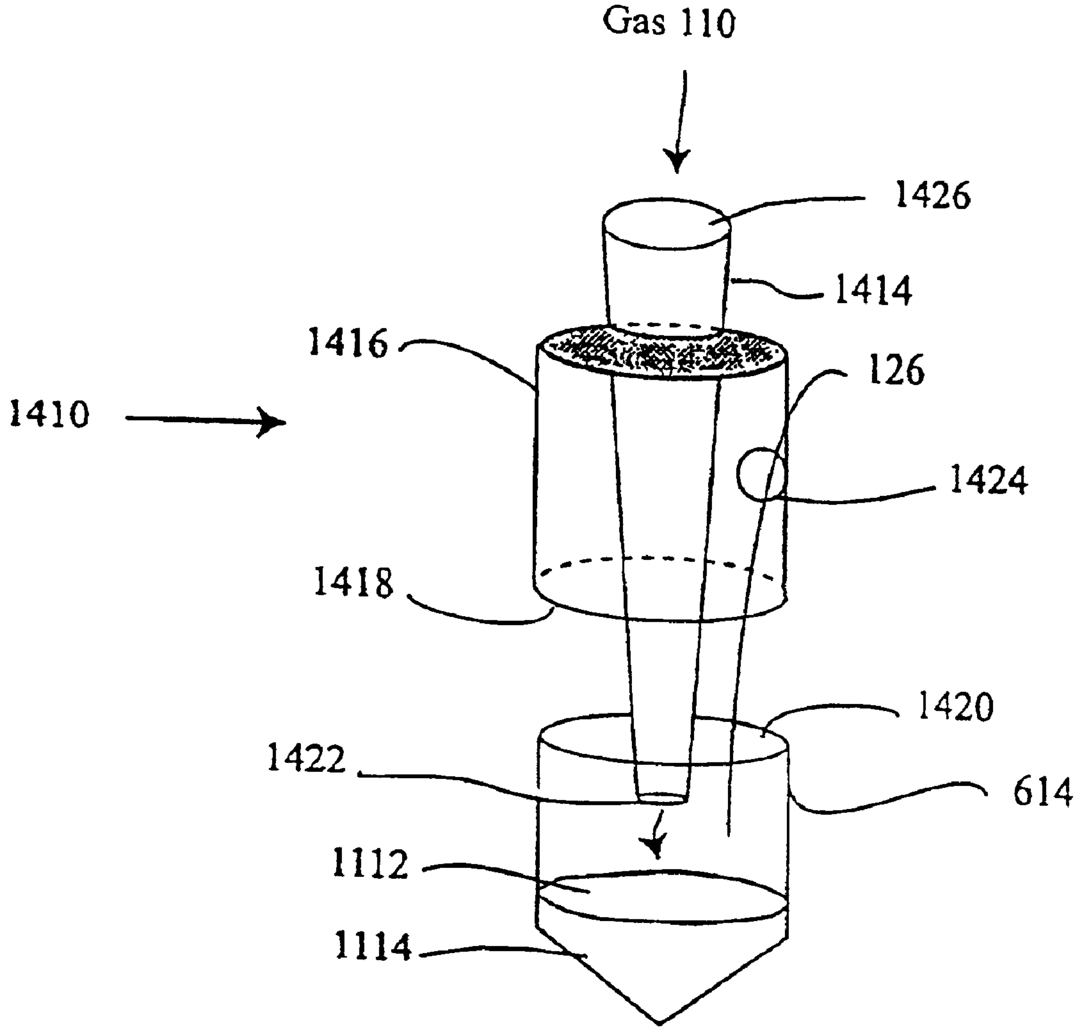
FIG. 14 illustrates a perspective view of a hollow, coaxial vapor recovery tube that can be employed in the present invention.

Referring to FIG. 14, another exemplary embodiment of a coaxial vapor recovery system includes a coaxial hollow tube 1410 that extends from a nozzle passage 630 (FIG. 6). Coaxial hollow tube 1410 includes a pipette 1414 that can be similar to hollow tubes **636*a* and/or 636*b*, illustrated in FIG. 11. Coaxial hollow tube 1410 includes an outer tube, or collar, 1416 having a seat 1418. When base plate 512 is in the closed position, seat 1418 is in sealing engagement with a rim 1420 of vessel 614. In operation, gas 122 enters a top opening 1426 of pipette 1414 and exits pipette 1414 from a lower opening 1422 to interact with surface 1112 of solution 1114. Portions of solution 1114 evaporate as exhaust vapors 126 and exit out of an opening 1424 of collar 1416. Collar 1416 substantially prevents exhaust vapors 126 from other vessels 614 from entering the vessel 614 illustrated in FIG. 14**.

Figure 15:
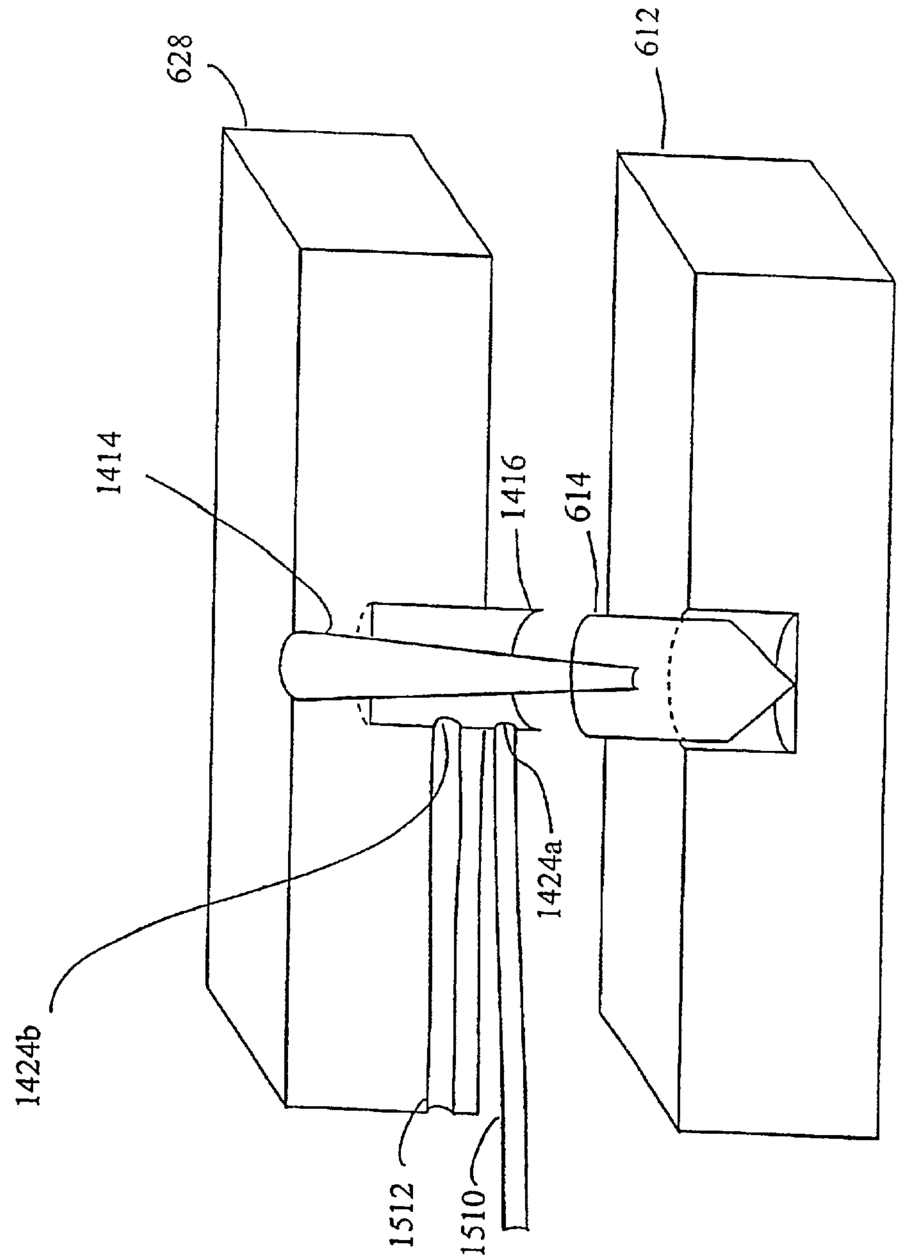
FIG. 15 illustrates a partially sectioned view of the hollow, coaxial vapor recovery tube illustrated in FIG. 14.

Referring to FIG. 15, a partial cutaway view of nozzle plate 628 and vessel tray 612 is illustrated. Exhaust vapors 126 that exits from exhaust opening **1424*a* can be captured by a hose 1510 coupled thereto. Alternatively, outer tube 1416 can be embedded within nozzle plate 628, where opening 1424*b* coincides with a passage 1512, within nozzle plate 628, that leads to exhaust passage 1012**.

C. Electrical Control System 130

Electrical control system 130 controls the drying of solutions in vessels 614 by controlling one or more of the pressure and temperature of gas 122 and the temperature of solutions 1114. In an exemplary embodiment, electrical control system 130 is a closed-loop system that controls one or more of the pressure and temperature of gas 122 and the temperature of solutions 1114, based on comparisons between measured values and predetermined values. In another embodiment, electrical control system 130 is an open-loop system that includes manual adjustments for controlling one or more of the pressure and temperature of gas 122 and the temperature of solutions 1114. In another embodiment, electrical control system 130 is a combination open-loop and closed-loop system.

Figure 16:
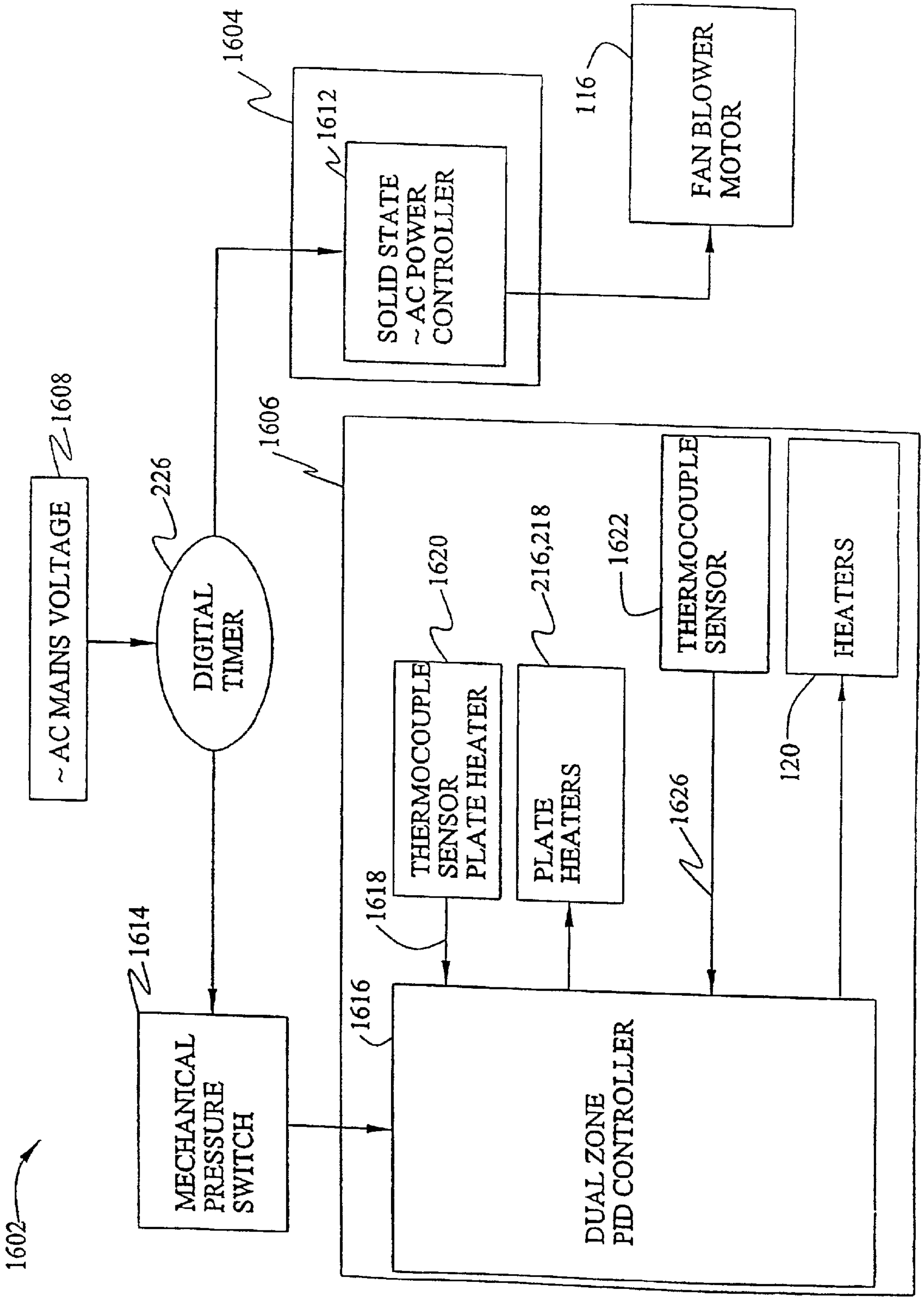
FIG. 16 illustrates a high-level block diagram of a combination open-loop and closed-loop electrical control system, in accordance with the present invention.

Referring to FIG. 16, a high-level block diagram illustrates electrical control system 130 as a combination open-loop and close-loop system 1602. Electrical control system 1602 uses an open-loop portion 1604 to control fan blower motor 116 and a close-loop portion 1606 to control the temperatures of gas 122 and solutions 1114.

In operation, an alternating current (AC) mains voltage 1608 supplies electrical power to digital timer 226. Digital timer 226 supplies electrical power to solid state AC power controller 1612, which provides power to fan blower motor 116. After a delay, digital timer 226 also supplies electrical power to a pressure switch 1614. The delay permits fan 116 to get up to speed before heat is applied to the system. Pressure switch 1614 is positioned downstream of fan blower motor 116 to measure the pressure of gas 122. When the pressure of gas 122 reaches a predetermined level, pressure switch 1614 closes a circuit that supplies electrical power to programmable interface dual-zone (PID) controller 1616.

PID controller 1616 controls the temperatures of solutions 1114 and gas 122. PID controller 1616 controls the temperature of solutions 1114 by comparing a signal indicative of a measured temperature with a signal indicative of a desired temperature of solutions 1114. For example, PID controller 1616 can receive a signal 1618 from a thermocouple heat sensor 1620 that is positioned within cavity 1010. Preferably, thermocouple heat sensor 1620 is positioned within cavity 1010 so that it is in physical contact with at least one vessel 614 or vessel tray 612. PID controller 1616 compares signal 1618 with a signal (not shown) that represents the desired temperature of solutions 1114. PID controller 1616 adjusts the temperature of heating elements 216, 218, according to the results of the comparison.

PID controller 1616 can be, for example, a PID controller available from Watlow Systems Integrators Co. of Decorah, Iowa, as part number DUAL-1JRX-200C. Suitable thermocouple sensors 1620 (i.e., temperature probes) include, for example, surface probes available from Cole-Parmer Instrument Company as part number E-08517-63. One skilled in the relevant art will recognize that a variety of PID controllers and temperature probes can be employed.

PID controller 1616 can control heaters 120 in a similar fashion. For example, PID controller 1616 can receive one or more signals 1626 indicative of a temperature of gas 122. Signals 1626 can be output from one or more thermocouple sensors 1622 that are disposed downstream of heaters 120. Signals 1626 can be compared to one or more signals (not shown) that are indicative of a desired temperature of gas 122. Based on the comparison, PID controller 1616 can control the temperature of heaters 120. Thermocouple sensors 1622 can be, for example, heater probes available from Cole-Parmer as part number E-08519-73. One skilled in the relevant art will recognize that a variety of temperature probes can be employed.

Alternatively, electrical control system 130 can employ open-loop heater controllers in place of closed-loop heater controllers 1616. For example, AC-power heater controllers available from Cole-Parmer as part number E-03052-65, can be employed. One skilled in the relevant art will recognize that any of a variety of open-loop heater controllers can be employed.

Electrical control system 130 can include a variety of optional features. For example, referring back to FIG. 2, in a closed-loop embodiment of electrical control system 130, one or more level detectors 236 can be used to measure the level of solution 1114 in one or more vessels 614. Based on a measured level, electrical control system 130 can control one or more of the pressure and temperature of gas 122 and the temperature of solutions 1114.

For example, when a solution level is at a high level, electrical control system 130 can set the pressure and/or temperature of gas 122 and/or the temperature of solutions 1114 to a low setting. This serves to reduce or prevent loss of solution due to foaming and bumping. When a sufficient amount of the solution dries, as detected by the level detector, the electrical control system can reset the pressure and temperature of gas 122 and the temperature of solutions 1114 to a higher setting.

Still referring to FIG. 2, another optional feature includes one or more moisture sensors 234 that sense the moisture content of solutions 1114. Moisture sensors 234 can be positioned within or downstream of drying chamber 124. Electrical control system 130 can terminate the drying process when the moisture content is reduced to a predetermined level. Alternately, the drying process can be terminated by a timer or can be terminated manually.

Figure 17A:
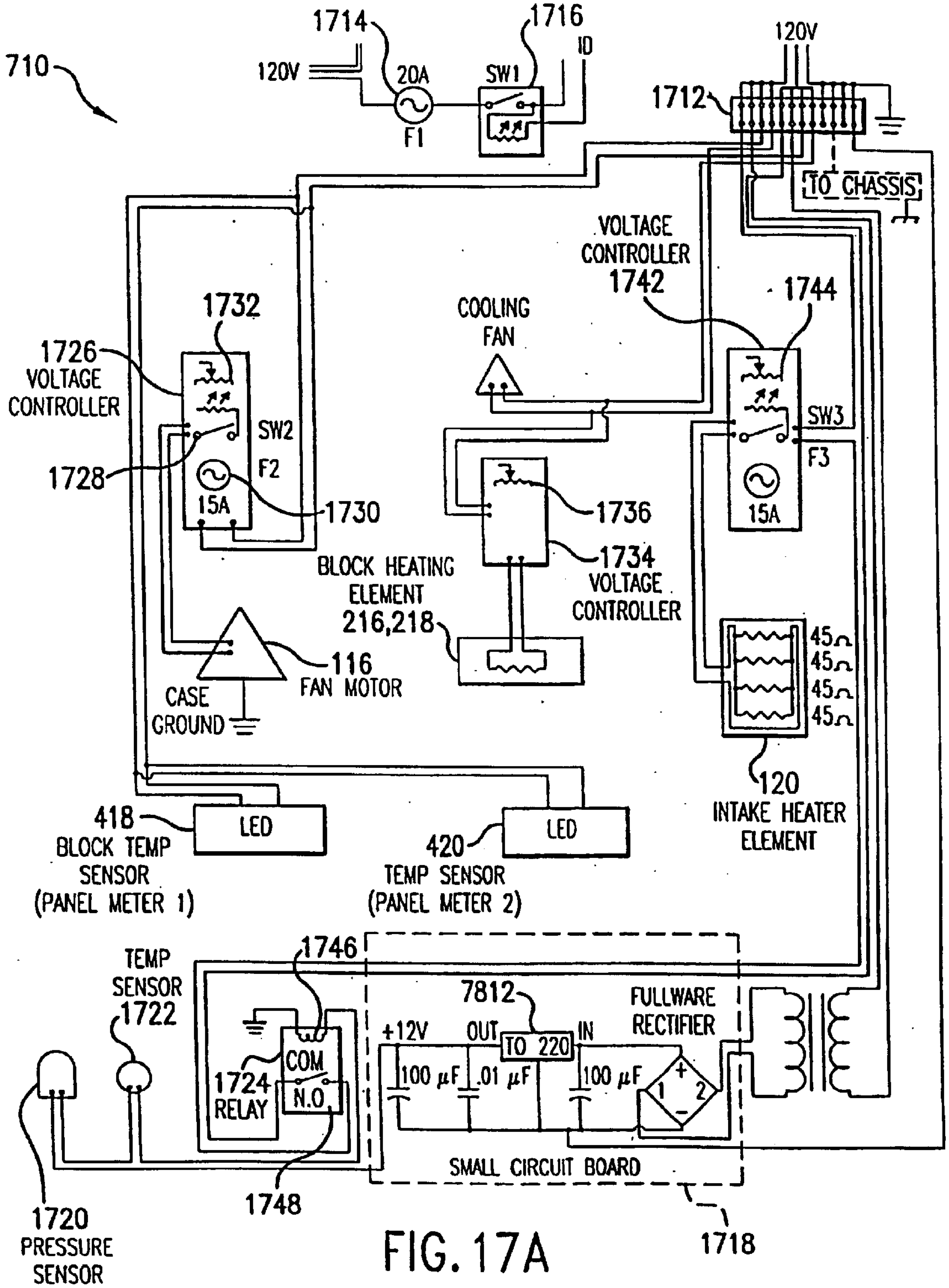
FIG. 17A is a schematic diagram illustrating a substantially open-loop electrical control system, in accordance with the present invention.
Figure 17B:
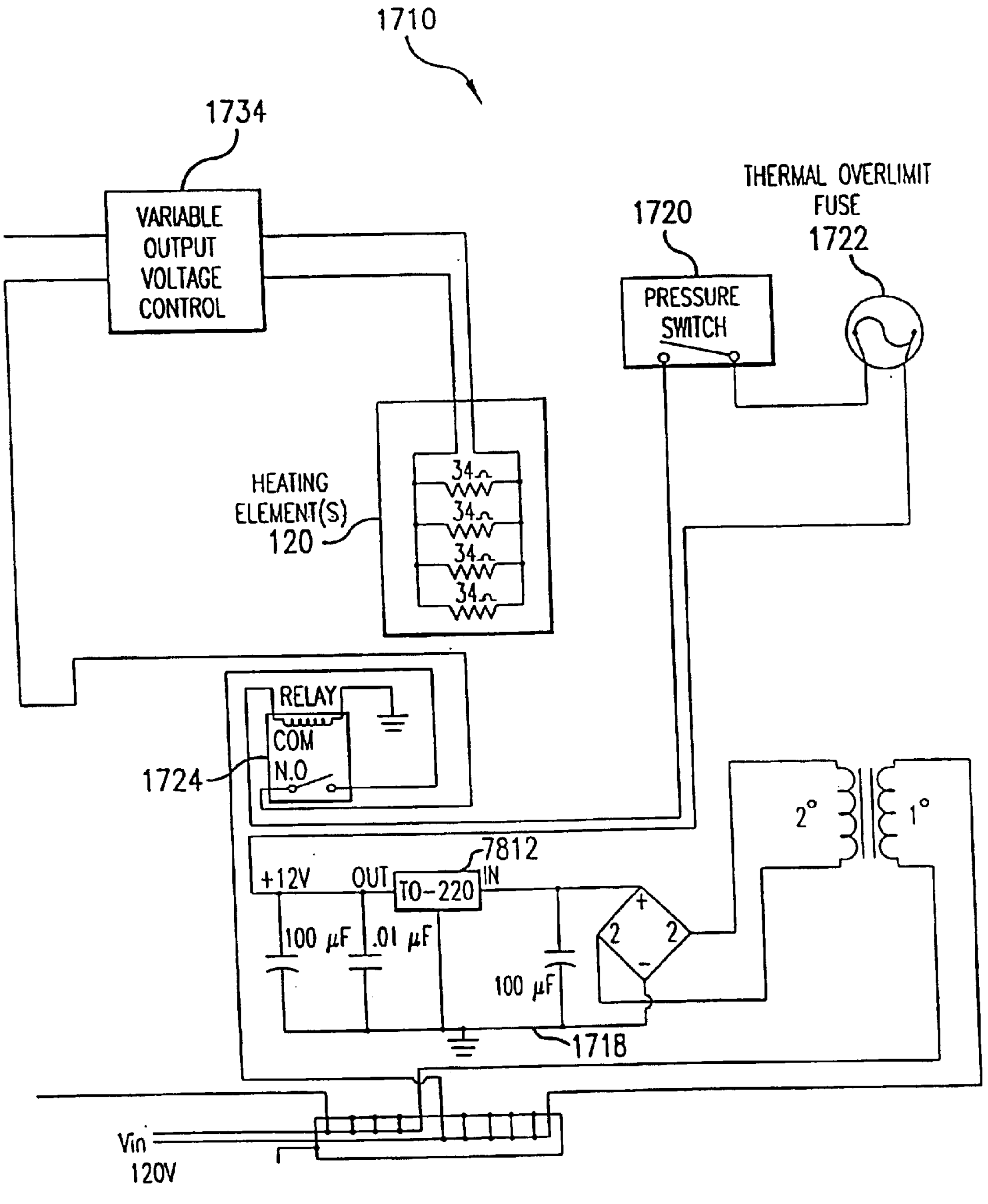
FIG. 17B is a schematic diagram illustrating an embodiment of a portion of the schematic diagram illustrated in FIG. 17A.

Referring to FIGS. 17A and 17B, electrical control system 130 is illustrated as a substantially open-loop control system 1710. The following disclosure includes references to FIG. 4, where a control panel 410 includes a variety of displays and manual adjustments for controlling gas temperature and pressure and solution temperature.

In FIG. 17A, AC power is supplied to a terminal block 1712. AC power can be applied to terminal block 1712 through, for example, a protective fuse 1714 and a manual on/off switch 1716.

A voltage controller 1726 receives AC power from terminal block 1712 and controls fan 116. Voltage controller 1726 can include a manual on/off switch 1728 and a manually adjustable control 1732 to control the speed of fan 116. A protective fuse 1730 disconnects power from voltage controller 1726 and fan 116 in the event of an over current draw. Manually adjustable control 1732, which is illustrated as control 412 in FIG. 4, can be, for example, an adjustable resistor.

A second voltage controller 1734 receives AC power from terminal block 1712 and controls the temperature of heating elements 216 and 218. Second voltage controller 1734 includes a manually adjustable control 1736 that controls heating elements 216 and 218. Manually adjustable control 1736, which is illustrated as control 414 in FIG. 4, can be, for example, an adjustable resistor.

Referring to back to FIGS. 17A and 17B, a rectifier circuit 1718 supplies DC power to a pressure sensor 1720 and to one or more temperature sensors 1722. Pressure sensor 1720 is disposed downstream of fan 116 to measure the pressure of gas 118. Temperature sensors 1722 can include a first temperature sensor disposed downstream of heater 120 to measure the temperature of gas 122 and/or a second temperature sensor that measures the temperature of solutions 1114. One skilled in the relevant art will recognize that a variety of temperature probes can be employed, such as temperature probes available from Cole-Parmer.

Figure 4:
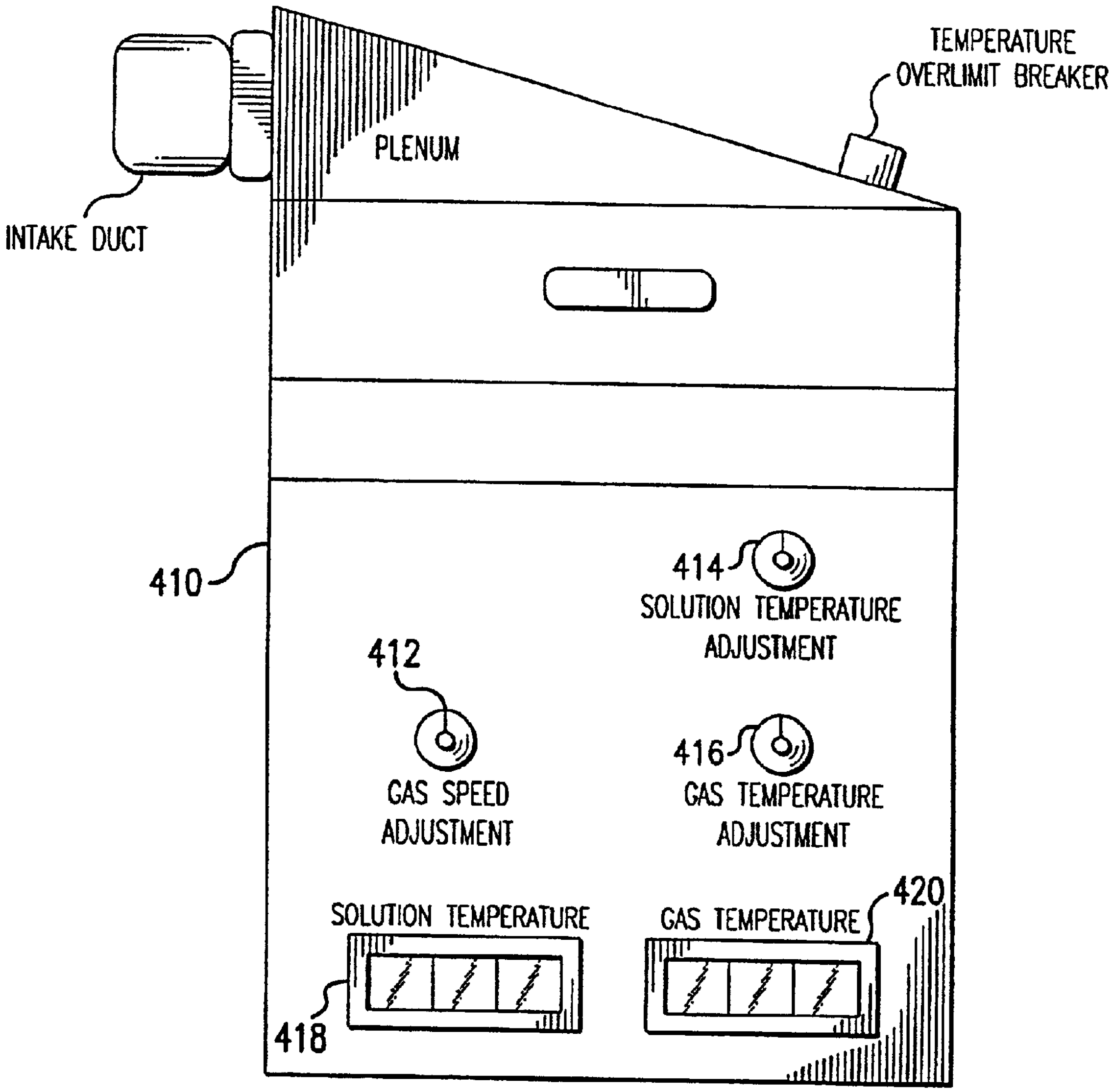
FIG. 4 illustrates a control panel that can be used as part of an open-loop electrical control system, in accordance with the present invention.

In FIG. 4, a display 418, which can be a liquid crystal display (LCD), provides a visual indication of the temperature of solutions 1114. A display 420 provides a visual indication of the gas temperature. Panel meters 418 and 420 can be, for example, panel meters available from Cole-Parmer.

Pressure sensor 1720 and temperature sensors 1722 control a relay circuit 1724. When pressure sensor 1720 senses sufficient gas flow from fan 116, and when inlet gas temperature sensors 1720 do not sense an over-limit temperature, current flows through coil 1746 of relay 1724. Coil 1746 closes normally open contact 1748, which provides AC power to third voltage controller 1742.

Third voltage controller 1742 includes a manually adjustable control 1744 that controls the temperature of heater(s) 120. Manually adjustable control 1744, which is illustrated as control 416 in FIG. 4, can be, for example, an adjustable resistor.

In another embodiment, relay 1724 can also control AC power to second voltage controller 1734, so that heaters 216 and 218 cannot be energized unless sufficient gas flow is detected by pressure sensor 1720.

In FIG. 4, controls 412, 414 and 416 permit a user to control the rate of drying of solutions 1114 and to reduce or prevent bumping and boiling of the solutions 1114 by adjusting gas pressure, gas temperature and/or solution temperature. For example, when there is a relatively large amount of a solution 1114 in a vessel 614, the user can set gas pressure, gas temperature and/or solution temperature to low levels. When a sufficient amount of solution 1114 has evaporated, the user can set gas pressure, gas temperature and/or solution temperature to high levels.

One skilled in the relevant art will recognize that an open-loop electrical control system 130 and a closed-loop electrical control system 130 can be implemented in a variety of fashions using a variety of commercially-available and/or design specific hardware, software, firmware or any combination thereof.

II. Method for Drying Solutions

Figure 18:
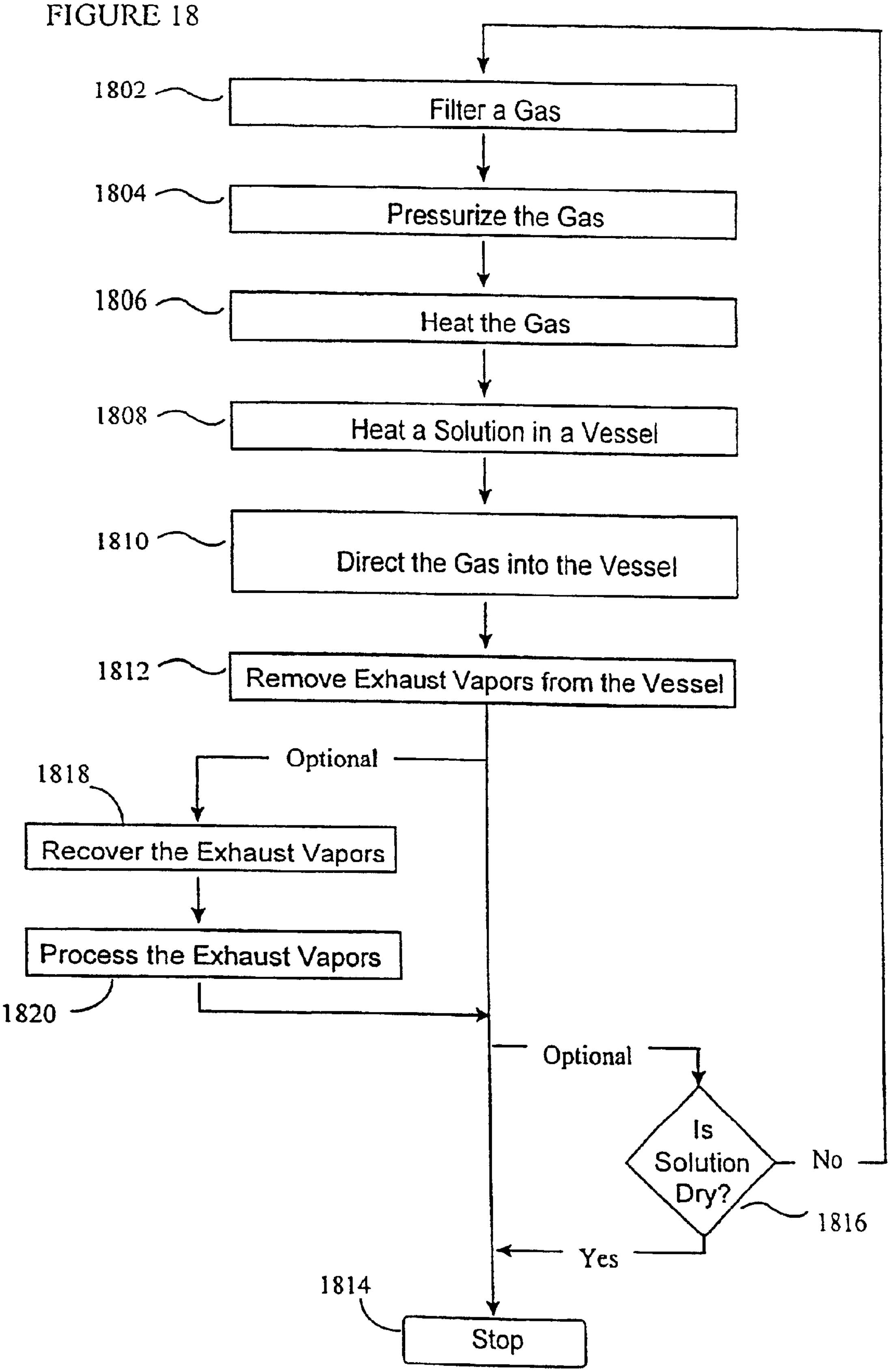
FIG. 18 is a process flow-chart of a method for drying solutions.

Referring to the process flowchart of FIG. 18, a method for drying solutions is provided. The process is described herein as performed by system 102. It will be apparent to one skilled in the relevant art, however, that the process illustrated in FIG. 18 can be performed by a variety of systems. Thus, operation of the present invention is not intended to be limited to the apparatus described with reference to system 102.

The process begins at a step 1802, where gas 110 is filtered. Gas 110 can be inert gas, air, oxygen, nitrogen, or any other gas or mixture of gasses that are suitable for drying solutions 1114. Step 1802 can be performed by HEPA filter 112 as illustrated in FIG. 2. Electrical control system 130 can include a filter monitor (not shown) that provides an indication, such as a visual indication, when one or more filter elements (not shown) within filter 112 need to be replaced.

In a step 1804, gas 110 is pressurized by fan 116. Electrical control system 130 can include a pressure switch downstream of fan 116 that can sense under-pressure and over-pressure conditions, so that electrical control system 130 can adjust the speed of fan 116. Steps 1802 and 1804 can be performed by a single, off-the-shelf, combination HEPA filter and fan blower motor.

In a step 1806, gas 110 is heated by one or more heaters 120. Heaters 120 can be located within duct system 210. Electrical control system 130 can include heat sensors downstream of heaters 120 that monitor the temperature of gas 110. A heater controller, such as a PID controller 1616, can automatically adjusts a voltage or current to heaters 120 in order to maintain gas 110 at a desired temperature. Alternatively, heaters 120 can be controlled with a manually adjustable control 1744.

In a step 1808, an array of solution-containing vessels 614 are heated. In an exemplary embodiment, one or more vessel trays 612 are placed on a heated surface of base plate 512.

One skilled in the relevant art will recognized that steps 1802–1808 can be performed in any suitable order. In addition, one or more of steps 1802–1808 can be omitted.

In a step 1810, gas 110, which can be heated, pressurized, filtered gas 122, is directed into vessels 614. For example, in FIG. 6, gas 110 is provided to plenum 640, via inlet 634. Plenum 640 directs gas 110 downwardly through passages 630, through hollow tubes 636 and into solution-filled vessels 614.

In an exemplary embodiment, gas 110 exits hollow tubes **636*a* and imparts substantially directly upon a surface 1112 of solution 1114. In another embodiment, gas 122 exits hollow tubes 636*b* substantially horizontal to surface 1112**.

In order to increase the rate of evaporation of solution 1114, solution-filled vessels 614 can be tilted at an angle, as illustrated in FIG. 13, to increase the exposed surface area **1112*b*. In an exemplary embodiment, vessels 614** are tilted at an angle of about twenty-five degrees.

In a step 1812, exhaust vapors 126 are removed from vessels 614. In an exemplary embodiment, exhaust vapors 122 are forced from vessels 614, through exhaust duct 222, under pressure from fan 116. Additionally, or alternatively, an exhaust fan (not shown) can be disposed downstream of dryer manifold 124 to draw exhaust vapors 126 away from vessels 614.

At this point, processing can proceed through a variety of options. In an exemplary embodiment, steps 1802–1812 are performed for a set period of time, such as 45 minutes, for example. At the end of the set period of time, processing stops at step a 1814.

Alternatively, in a step 1816, electrical control system 130 determines whether solutions 1114 are dry. For example, one or more moisture meters 234 can be installed within each of front chamber 212 and rear chamber 214. Alternatively, a single moisture meter 234 can be disposed downstream of dryer manifold 124. While the moisture level remains above a predetermined level, steps 1802–1812 are performed as a continuous loop. When the moisture level drops below the predetermined level, processing proceeds to and stops at step 1814.

Another option is vapor recovery. In a step 1818, exhaust vapors 126 are recovered. In an embodiment, exhaust vapors 122 can be received by a conventional vapor recovery system 128. In another embodiment, a coaxial vapor recovery system can be employed to substantially prevent exhaust vapors 126 exiting a vessel 614 from contaminating a solution 1114 in another vessel 614,. For example, vapor recovery plate 2510 can be employed. As another example, coaxial tubes 1410 can be employed.

In a step 1820, recovered exhaust vapors 126 are processed. Processing can include processing in accordance with state or federal environmental protection regulations, in accordance with industry standards, in accordance with any other standards, or any combination thereof.

Processing proceeds to, and stops at, step 1814.

III. Conclusions

While the invention has been particularly shown and described with reference to preferred embodiments thereof, it will be understood by those skilled in the relevant arts that various changes in form and details can be made therein without departing from the spirit and scope of the invention.

What is claimed is:

1. A method for drying a solution containing macromolecules, comprising the steps of:

(1) receiving a vessel containing the solution;

(2) directing a gas into the vessel;

(3) sensing a moisture content of the solution; and (4) terminating step (2) when the moisture content of the solution reaches a predetermined level.

2. The method according to claim 1, further comprising the step of:

(5) filtering the gas.

3. The method according to claim 1, further comprising the step of:

(5) heating the gas.

4. The method according to claim 3, further comprising the steps of:

(6) monitoring a temperature of the gas; and (7) adjusting the temperature of the gas to correspond to a desired temperature.

5. The method according to claim 1, further comprising the step of:

(5) pressurizing the gas.

6. The method according to claim 5, further comprising the steps of:

(6) monitoring a pressure of the gas; and (7) adjusting the pressure of the gas to correspond to a desired pressure.

7. The method according to claim 1, further comprising the step of:

(5) heating the solution in the vessel.

8. The method according to claim 7, further comprising the step of:

(6) monitoring a temperature of the solution; and (7) adjusting the temperature of the solution to correspond to a desired temperature.

9. The method according to claim 1, further comprising the step of:

(5) performing steps (1)–(4) on a plurality of vessels.

10. The method according to claim 1, further comprising the step of:

(5) tilting the vessel.

11. The method according to claim 1, wherein step (2) comprises the step of:

(a) directing the gas substantially at the solution.

12. The method according to claim 1, wherein step (2) comprises the step of:

(a) directing the gas substantially horizontal to the solution.

13. The method according to claim 1, further comprising the steps of:

(5) heating the solution to a first temperature when a level of the solution is at a first level; and (6) heating the solution to a second temperature when the level of the solution in the vessel is at a second level.

14. A method according for drying a solution containing macromolecules, comprising the steps of:

(1) receiving a vessel containing the solution;

(2) directing a gas into the vessel;

(3) pressurizing the gas to a first pressure when a level of the solution is at a first level; and (4) pressurizing the gas to a second pressure when the level of the solution in the vessel is at a second level.

15. The method according to claim 14, further comprising the step of:

(5) filtering the gas.

16. The method according to claim 14, further comprising the step of:

(5) heating the gas.

17. The method according to claim 16, further comprising the steps of:

(6) monitoring a temperature of the gas; and (7) adjusting the temperature of the gas to correspond to a desired temperature.

18. The method according to claim 14, further comprising the steps of:

(5) monitoring a pressure of the gas; and (6) adjusting the pressure of the gas to correspond to a desired pressure.

19. The method according to claim 14, further comprising the step of:

(5) heating the solution in the vessel.

20. The method according to claim 19, further comprising the steps of:

(6) monitoring a temperature of the solution; and (7) adjusting the temperature of the solution to correspond to a desired temperature.

21. The method according to claim 14, further comprising the step of:

(5) performing steps (1)–(4) on a plurality of vessels.

22. The method according to claim 14, further comprising the step of:

(5) tilting the vessel.

23. The method according to claim 14, wherein step (2) comprises the step of:

(a) directing the gas substantially at the solution.

24. The method according to claim 14, wherein step (2) comprises the step of:

(a) directing the gas substantially horizontal to the solution.

25. The method according to claim 14, further comprising the steps of:

(5) heating the solution to a first temperature when a level of the solution is at a first level; and (6) heating the solution to a second temperature when the level of the solution in the vessel is at a second level.

26. A method for drying a solution containing macromolecules, comprising the steps of:

(1) receiving a vessel containing the solution;

(2) directing a gas into the vessel;

(3) heating the gas to a first temperature when a level of the solution is at a first level; and (4) heating the gas to a second temperature when the level of the solution in the vessel is at a second level.

27. The method according to claim 26, further comprising the step of:

(5) filtering the gas.

28. The method according to claim 26, further comprising the steps of:

(5) monitoring a temperature of the gas; and (6) adjusting the temperature of the gas to correspond to a desired temperature.

29. The method according to claim 26, further comprising the step of:

(5) pressurizing the gas.

30. The method according to claim 29, further comprising the steps of:

(6) monitoring the pressure of the gas; and (7) adjusting the pressure of the gas to correspond to a desired pressure.

31. The method according to claim 26, further comprising the step of:

(5) heating the solution in the vessel.

32. The method according to claim 31, further comprising the steps of:

(6) monitoring a temperature of the solution; and (7) adjusting the temperature of the solution to correspond to a desired temperature.

33. The method according to claim 26, further comprising the step of:

(5) performing steps (1)–(4) on a plurality of vessels.

34. The method according to claim 26, further comprising the step of:

(5) tilting the vessel.

35. The method according to claim 26, wherein step (2) comprises the step of:

(a) directing the gas substantially at the solution.

36. The method according to claim 26, wherein step (2) comprises the step of:

(a) directing the gas substantially horizontal to the solution.

37. The method according to claim 26, further comprising the steps of:

(5) heating the solution to a first temperature when a level of the solution is at a first level; and (6) heating the solution to a second temperature when the level of the solution in the vessel is at a second level.

* * * * *